United States Patent
Zimmer et al.

(10) Patent No.: US 6,816,321 B2
(45) Date of Patent: Nov. 9, 2004

(54) AFOCAL ZOOM FOR USE IN MICROSCOPES

(75) Inventors: Klaus-Peter Zimmer, Heerbrugg (CH); Ruedi Rottermann, Berneck (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/434,298

(22) Filed: May 8, 2003

(65) Prior Publication Data

US 2003/0210470 A1 Nov. 13, 2003

(30) Foreign Application Priority Data

May 10, 2002 (DE) .......................................... 102 22 041

(51) Int. Cl.$^7$ .............................................. G02B 15/14
(52) U.S. Cl. ........................ 359/686; 359/744; 359/380
(58) Field of Search ................................ 359/686, 683, 359/679, 676, 744, 656–660, 462, 466, 473, 368, 379–380

(56) References Cited

U.S. PATENT DOCUMENTS

| | | | |
|---|---|---|---|
| 3,679,286 A | 7/1972 | Klein | 359/677 |
| 4,666,258 A | 5/1987 | Kimura | 359/686 |
| 5,825,535 A | * 10/1998 | Biber et al. | 359/380 |
| 6,157,495 A | 12/2000 | Kawasaki | 359/686 |
| 6,320,702 B1 | 11/2001 | Yonezawa | 359/686 |
| 6,335,833 B1 | 1/2002 | Kawasaki | 359/686 |
| 6,674,582 B2 | * 1/2004 | Kawasaki | 359/690 |

FOREIGN PATENT DOCUMENTS

| | | |
|---|---|---|
| DE | 2 038 190 | 7/1970 |
| DE | 26 40 454 | 9/1976 |

OTHER PUBLICATIONS

Klaus–Peter Zimmer, "Optical Designs for Stereomicroscopes", International Optical Design Conference 1998, Proceedings of SPIE, vol. 3482, pp. 690–697 (1998).

* cited by examiner

Primary Examiner—Jordan M. Schwartz
(74) Attorney, Agent, or Firm—Hodgson Russ LLP

(57) ABSTRACT

The invention relates to an afocal zoom (1) for use in microscopes of high resolution and high zoom factors having a tube lens (11), the zoom comprising four successive optical assemblies (G1, G2, G3, G4) when viewed from the object end, the first assembly (G1) having a positive focal length (f1), the second assembly (G2) a negative focal length (f2), the third assembly (G3) a positive focal length (f3), and the fourth assembly (G4) a negative focal length (f4), and the first and the fourth assembly (G1, G4) being arranged in stationary fashion and the second and the third assembly (G2, G3) being arranged movably for modifying the magnification of the zoom (1), the zoom magnification decreasing with increasing distance (D23) between the two assemblies (G2, G3). The zoom operates in the range of "useful magnification" of the microscope with sufficient contrast if the zoom meets the meets specific conditions.

13 Claims, 17 Drawing Sheets

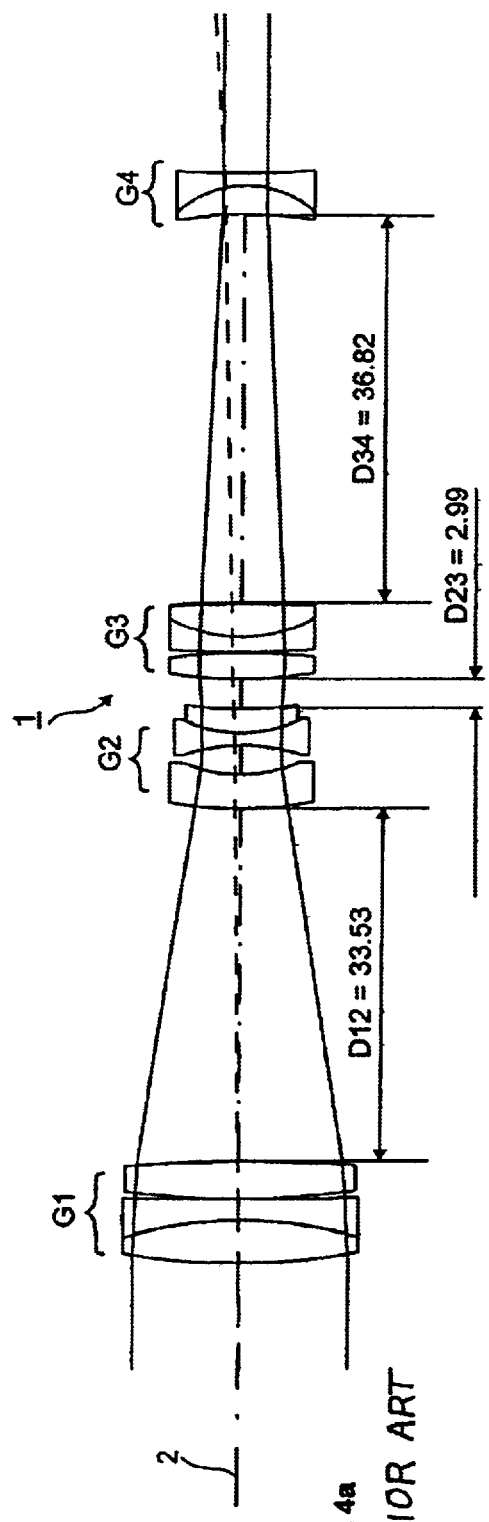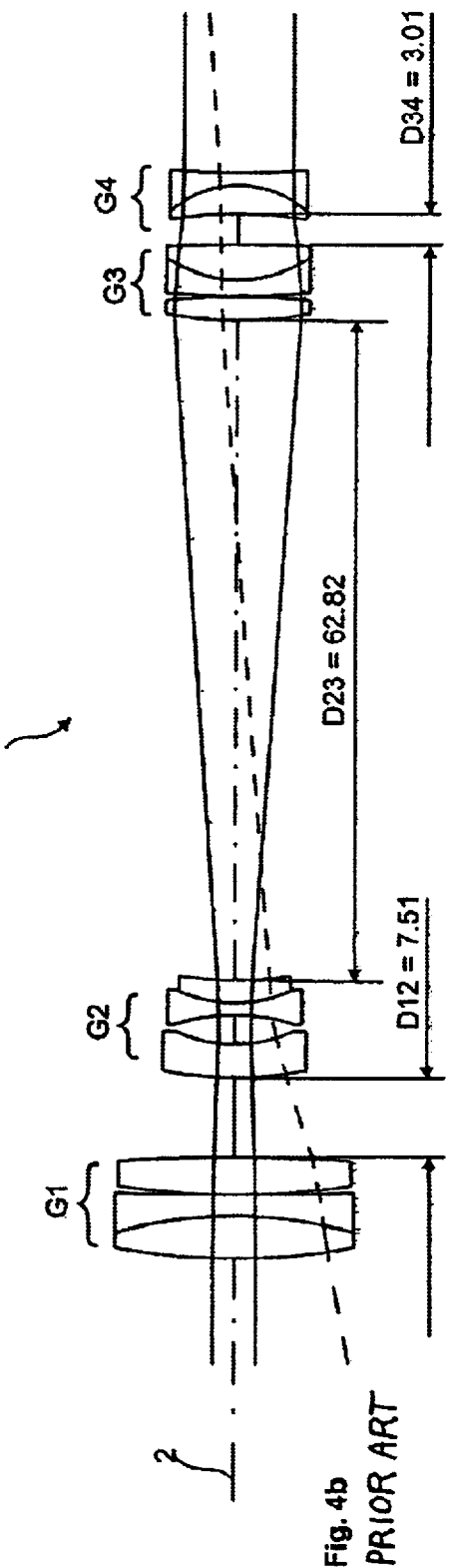
Fig. 4a PRIOR ART
Fig. 4b PRIOR ART

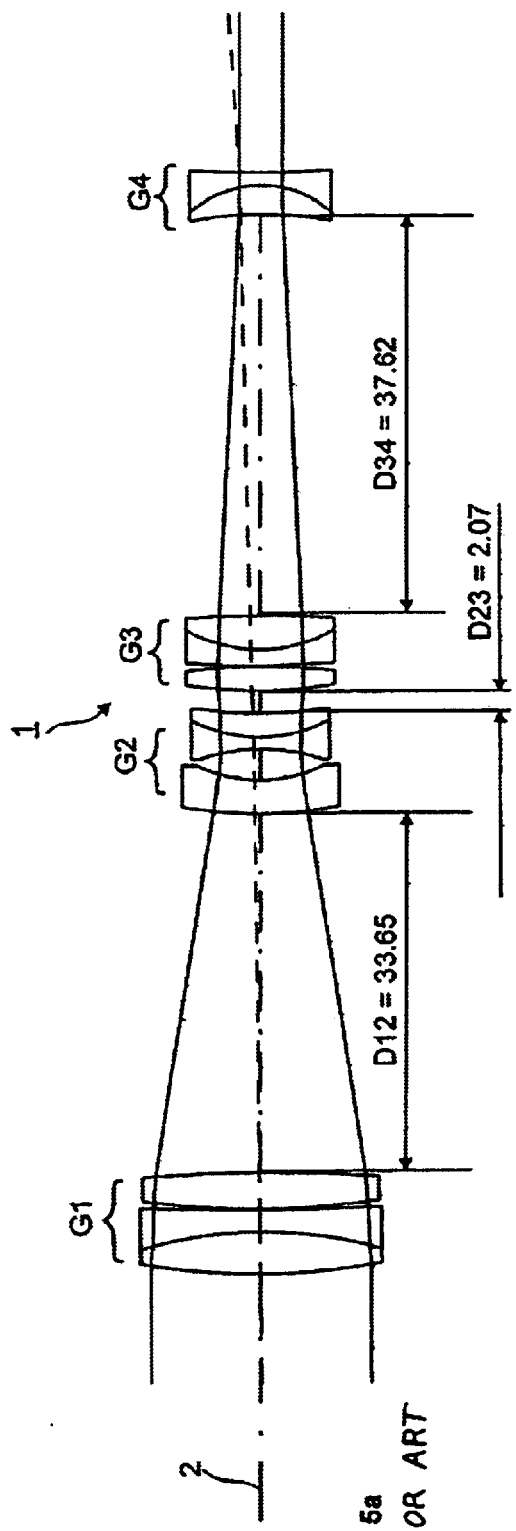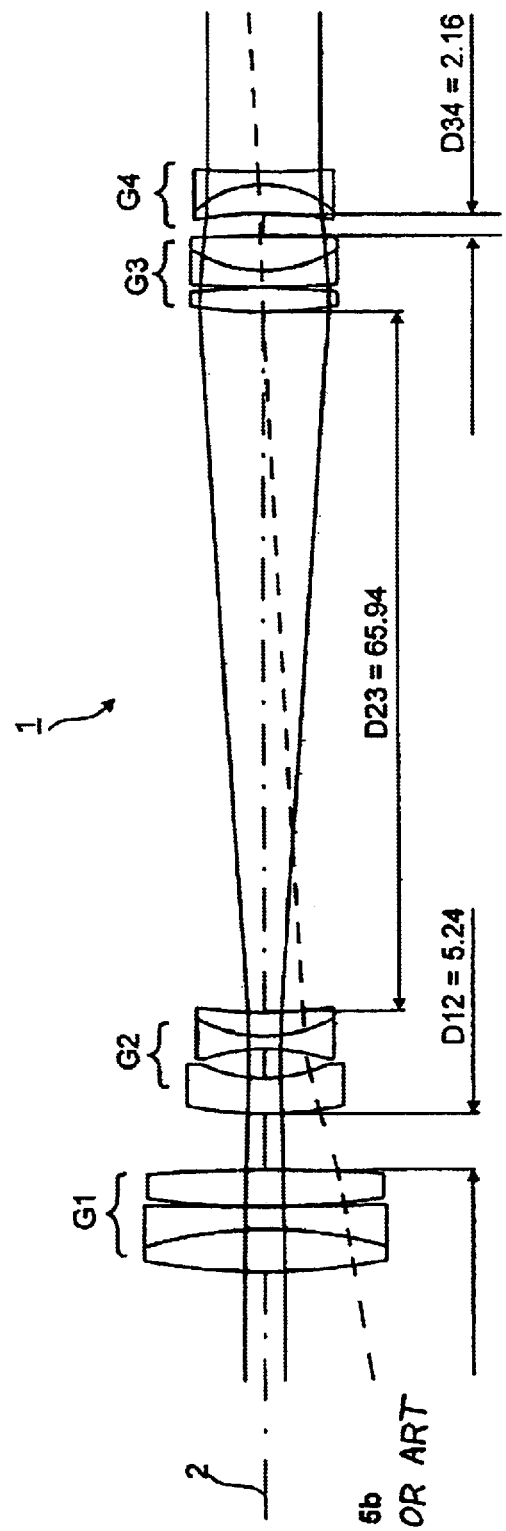
Fig. 5a PRIOR ART
Fig. 5b PRIOR ART

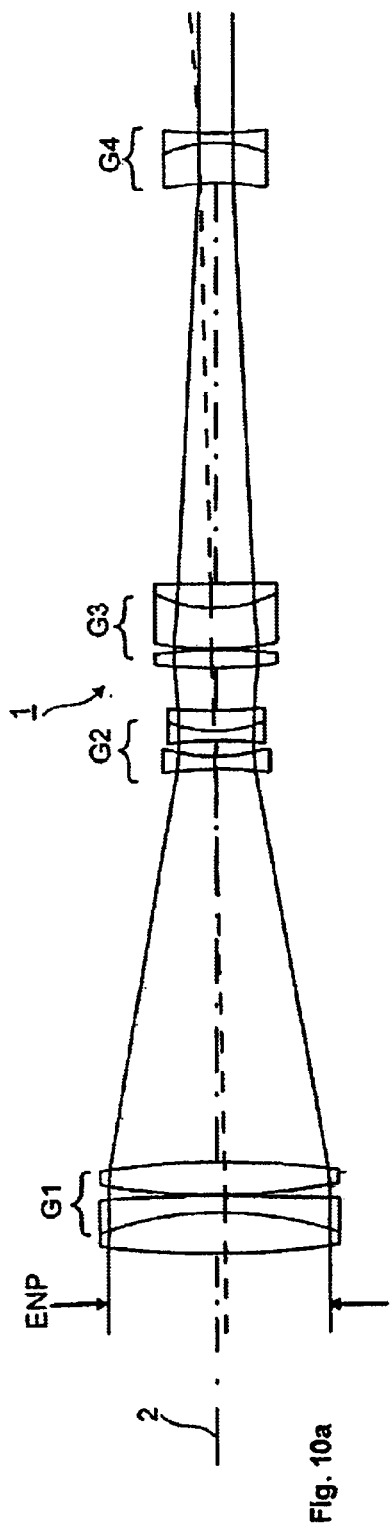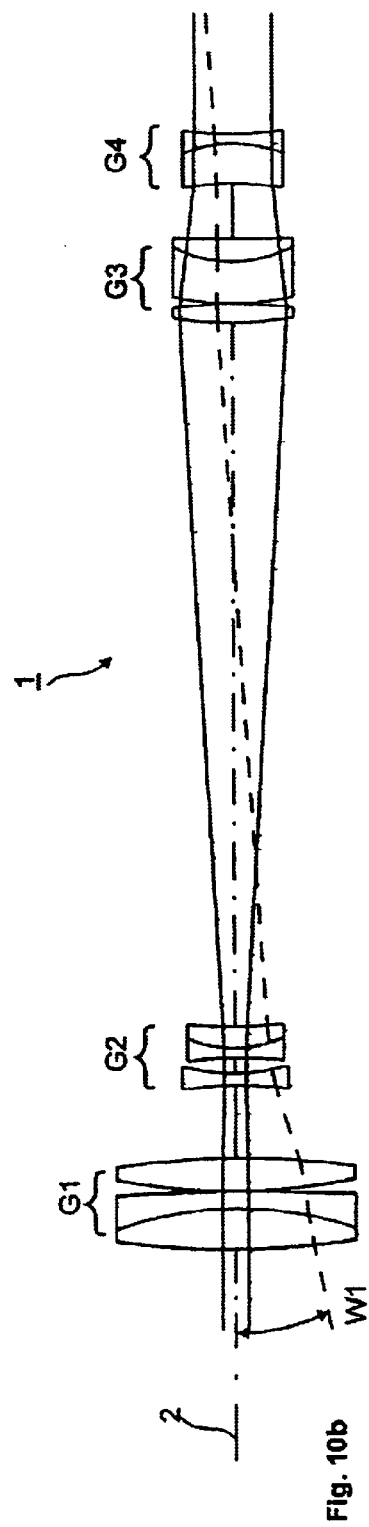
Fig. 10a
Fig. 10b

AFOCAL ZOOM FOR USE IN MICROSCOPES

CROSS-REFERENCES TO RELATED APPLICATIONS

This application claims priority of the German patent application 102 22 041.7 filed May 10, 2002, which is incorporated by reference herein.

1. Field of the Invention

The invention concerns an afocal zoom for use in microscopes having a tube lens, the zoom comprising four successive optical assemblies when viewed from the object end, the first assembly having a positive focal length, the second assembly a negative focal length, the third assembly a positive focal length, and the fourth assembly a negative focal length, and the first and the fourth assembly being arranged in stationary fashion and the second and the third assembly being arranged movably for modifying the magnification of the zoom, the zoom magnification decreasing with increasing distance between the second and the third assembly. The invention furthermore concerns a microscope as well as a stereomicroscope having such an afocal zoom.

2. Description of the Related Art

Microscopes, in particular stereomicroscopes, having an afocal zoom of the aforesaid kind are used wherever high specimen magnification is required, for example in technology enterprises for the manipulation and inspection of small objects, e.g. semiconductor features or micromechanical objects; in research institutions in the biological sciences and materials science; and, for example, for the examination and manipulation of cells or even for surgical purposes. As miniaturization continues and as ever-smaller specimens are being investigated, not only do the requirements concerning the resolution of such microscopes increase, but the size of the field of view at low magnification (for rapid positioning of specimens and for an improved overview during inspections) also becomes more important.

In order to increase a microscope's magnification and allow it to be modified steplessly over a certain range, the microscope is equipped with a zoom. An afocal zoom images an object at infinity in an image located at infinity. Designating the angle with respect to the optical axis at which an object point appears at infinity as wE, and the emergence angle (after passing through the zoom) at which the image point appears at infinity as wA, the magnification of the zoom is then VZO=tan(wA)/tan(wE). The zoom system allows magnification to be varied without changing the location of the object or the image. The ratio between maximum and minimum zoom magnification is called the "zoom factor" z.

FIG. 1 shows an afocal zoom 1 constructed in accordance with the preamble of Claim 1. A zoom construction of this kind is known, for example, from "Optical Designs for Stereomicroscopes," K. -P. Zimmer, in International Optical Design Conference 1998, Proceedings of SPIE, Vol. 3482, pp. 690–697 (1998), or from U.S. Pat. No. 6,320,702. The known zoom type comprises, viewed from the object, four optical assemblies G1, G2, G3, and G4, groups G1 and G4 being arranged in stationary fashion. Group G1 possesses a positive focal length f1, group G2 a negative focal length f2, group G3 again a positive focal length f3, and the fourth group G4 once again a negative focal length f4. To modify the magnification of the zoom, the movably arranged groups G2 and G3 are displaced. FIG. 1$a$) indicates the highest-magnification position, and FIG. 1$b$) the lowest-magnification position. The change in the position of assemblies G2 and G3 is accomplished, under the control of cams, along optical axis 2. The Wüllner equations known from the literature can be used to calculate the corresponding distances—i.e. distance D12 between assemblies G1 and G2, distance D23 between assemblies G2 and G3, and distance D34 between assemblies G3 and G4—on the basis of a known distance between the focal points of groups G1 and G4, the known focal lengths f2 and f3, and a selected magnification (of groups G2 and G3).

As depicted in FIG. 1, D23 is minimal at the greatest magnification and increases from there with decreasing zoom magnification, so that D12 and D34 are minimal at the lowest zoom magnification. The zoom factor of a system of this kind is limited only by the fact that assemblies G2 and G3 at maximum magnification, and assemblies G1 and G2 as well as G3 and G4 at minimum magnification, must not interpenetrate.

ENP designates the diameter of the entrance pupil of zoom 1 at the greatest magnification (FIG. 1$a$)). Diameter EP of the entry pupil of the zoom is maximal at the greatest zoom magnification. Entrance field angle wE of the zoom designates the visual angle at which an object appears at infinity. This angle becomes minimal at the weakest zoom magnification and assumes a value w1, as is evident from FIG. 1$b$). Overall length L of the zoom corresponds to the distance between the outer vertices of assemblies G1 and G4.

FIG. 2 is a sketch of a microscope having an afocal zoom 1. An object 9 is arranged at the anterior focal point of objective 10, and is imaged thereby at infinity. The downstream afocal zoom 1 modifies the magnification within a selectable range, and once again images the object at infinity. Arranged behind zoom 1 is a tube lens 11 which generates an intermediate image 12 that in turn is visually observed through an eyepiece 13 by eye 17. EP designates the diameter of the entrance pupil of zoom 1. AP designates the diameter of the exit pupil of the microscope after eyepiece 13. It is known that the resolution of the microscope depends on numerical aperture nA of objective 10, which is defined as the sine of half the angular aperture α of the cone having its vertex at the center of the object and is limited by entrance pupil EP. Well-corrected optical systems that satisfy the sine condition are known to be governed by the equation EP=2×fO nA, where fO refers to the focal length of objective 10. For a wavelength λ=550 nm, the rule of thumb for calculating the resolution capability is 3000×nA (in line pairs per millimeter). Since the numerical aperture increases with the diameter of the entrance pupil, it is obvious that a large diameter EP is needed in order to achieve high resolution.

FIG. 3 shows the schematic construction of a stereomicroscope of the telescopic type. The stereomicroscope allows the viewer to obtain a three-dimensional impression of object 9 being viewed. For that purpose, object 9, which is located at the anterior focal point of objective 10, is imaged through two separate observation channels. The two observation channels 15L and 15R are of identical construction and each contain a zoom system 1L, 1R, a tube lens 11L, 11R, and a respective eyepiece 13L and 13R. Image erection systems 16L, 16R arranged behind tube lenses 11L, 11R provide right-reading erect intermediate images 12L and 12R which are visually viewed by a pair of eyes 17L and 17R using the pair of identical eyepieces 13L, 13R. The two zoom systems 1L and 1R selectably modify the magnification, but identically for the right and the left channel.

The two intermediate images 12L and 12R are different images of object 9, since object 9 is viewed at angle wL in left channel 15L and at angle wR in right channel 15R. This makes possible stereoscopic viewing of object 9, just as an object is viewed by the pair of eyes. The two different images are processed in the brain to yield a three-dimensional image.

EP once again designates the diameter of the entrance pupil of the zoom, EP being identical for the two identically adjustable zooms 1L and 1R. uL and uR designate half the angular aperture of the cone, with vertex at the center of the object, that is limited by the entrance pupil. uL and uR are identical in size, since the microscope is symmetrical with respect to axis 14 of objective 10. uL and uR can consequently both be designated u. Since wR and wL are not large, the relevant equation (by analogy with the microscope of FIG. 2) is EP=2×fO×sin(u)=2×fO×nA, where nA once again represents the numerical aperture, but this time referred to the entrance pupil of the zoom, downstream from objective 10, in each channel.

The aforementioned article by K. -P. Zimmer, "Optical Designs for Stereomicroscopes" (1998), presents a zoom, for a stereomicroscope as described above, such as the one depicted schematically in FIG. 4. A zoom of this kind was placed on the market by the Applicant on Apr. 3, 1995 under the designation "MZ 12." This zoom is constructed in accordance with the preamble of Claim 1. At the greatest magnification VZO of the zoom, the entrance pupil diameter ENP=20 mm, the distances between optical assemblies G1, G2, G3, G4 are D12=33.53 mm, D23=2.99 mm, and D34=36.82. The focal lengths of the groups are f1=65.47 mm, f2=−15.30 mm, f3=32.17 mm, and f4=−43.65 mm. At its lowest magnification setting (see FIG. 4b)), the distances are D12=7.51 mm, D23=62.82 mm, D34=3.01 mm. The zoom depicted in FIG. 4 has a zoom factor z of 12.5, and |f1/f2|=4.28.

The zoom depicted in FIG. 4 can, in accordance with the Wüllner equations known from the literature, be adjusted to a greater zoom factor z by displacing optical assemblies G2 and G3 farther along optical axis 2 without interpenetration of the lens groups. As is evident from FIG. 5a), assembly G2 is displaced 0.12 mm toward G3, and assembly G3 is displaced 0.8 mm toward G2, so that distance G23=2.07 mm and accordingly D12=33.65 mm and D34=37.62 mm. At this setting, zoom magnification VZO=52. In FIG. 5b), as compared to the setting in FIG. 4b), assembly G2 is displaced 2.27 mm toward G1, and G3 is displaced 0.85 mm toward G4. At this setting, zoom magnification VZO is 0.3517. This therefore results in a zoom factor z=14.8 for the zoom depicted in FIG. 5. In addition |f1/f2|=4.28 and |z/(f1/f2)|=3.46.

The disadvantage of the configuration depicted in FIG. 5 is that an increase in the zoom range toward higher magnifications does not result in higher resolution. Higher resolution can be obtained only by means of greater entrance pupil diameters, and with stereomicroscopes in particular this results in large dimensions (see Zimmer, "Optical Designs for Stereomicroscopes," 1998, p. 693). Once the resolution limit has been reached, an increase in microscope magnification yields so-called "empty magnification," in which no further details become recognizable despite the increasing magnification.

Lastly, U.S. Pat. No. 6,320,702 B1 protects an afocal zoom for microscopes that also comprises four assemblies G1 through G4 that have alternately positive and negative focal lengths. Claimed therein are zooms having a zoom factor z>14 and a focal length ratio between focal length groups G1 and G2 |f1/f2|>3.9. Cited therein as an advantageous further condition is 3<|z/(f1/f2)|<5. This limitation is intended to prevent not only excessive zoom lengths, but also any interpenetration of first and second lens groups G1 and G2.

The zoom according to U.S. Pat. No. 6,320,702 B1 contains more lens elements in total than the zoom depicted in FIGS. 4 and 5, and furthermore has the disadvantage, discussed in connection with FIG. 5, that a higher zoom factor alone is not suitable for increasing the resolution of the microscope. In addition, a greater zoom magnification is disadvantageously associated with a reduction in the diameter of the microscope's exit pupil at maximum magnification.

SUMMARY OF THE INVENTION

It is therefore the object of the present invention to describe an afocal zoom of the kind cited initially, for high resolution microscopes having a high zoom factor, which makes possible a continuously modifiable magnification over the greatest possible range simultaneously with the greatest possible resolution. In addition, the requirements in terms of increasing fields of view are to be met.

This object is achieved by way of the features of independent Claims 1 and 2. Advantageous embodiments are evident from the respective dependent claims and from the description below.

The condition VZO≦41×ENP/fT, hereinafter referred to as (B1), defines for the zoom magnification an upper limit that is proportional to the ratio between diameter ENP of the zoom entrance pupil at maximum zoom magnification and focal length fT of the microscope's tube lens. The performance data of the zoom are thereby linked to optical variables of the microscope. Conformity with (B1) guarantees that the high microscope magnification lies within the range of useful magnification, and limits the contrast falloff with small exit pupils.

The "useful magnification" of a microscope is defined as that range of microscope magnification within which all object features are resolved, imaged in magnified fashion, and recognized by the human eye. Greater magnification is possible but not useful, since additional details, which cannot be imaged by the microscope objective because of limited resolution, cannot be recognized (i.e. empty magnification, resulting in a larger image but not in finer features). Detail recognition additionally depends on the contrast of the image. The exit pupil diameter of the microscope plays a role here, since with increasing diameter, brighter images are supplied and the contrast loss due to diffraction in the eye and irregularities in the vitreous body of the eye are reduced.

Conformity with condition (B1) according to the present invention thus ensures, for high-resolution microscopes with ENP>21 mm, that as zoom magnification VZO increases, detail recognition also rises, and that the contrast falloff which works against detail recognition at the same time remains limited.

While (B1) defines a condition for the afocal zoom at maximum magnification, condition (B2) below describes a requirement for the zoom at its lowest magnification. According to the present invention, (B2) is tan(w1) ≧0.268× z/ENP, in which w1, as is evident from FIG. 1b), is defined as the entrance field angle of the zoom at minimum magnification, and z represents the zoom factor, i.e. the ratio between maximum and minimum zoom magnification, such that $z>15$. ENP (in units of mm) once again designates the diameter of the zoom entrance pupil at maximum magnification (cf. FIG. 1a)), such that ENP>21 mm. Conformity with B2) guarantees, like (B1), that operation is occurring in the range of useful magnification, and also that at the lowest magnification, a field-of-view diameter (diameter of the intermediate image) of at least 22 mm is usable. This advantageous property for a microscope is stated by condition (B2) on the basis of the requisite performance of the zoom in terms of field angle w1 at minimum magnification, taking in to account zoom factor z and maximum diameter ENP of the entrance pupil. The advantageous result is that in zooms having a given entrance pupil diameter ENP, a larger field of view is usable even as zoom factor z increases. This prevents vignetting at the lowest magnifications, and thus makes possible rapid positioning of specimens and/or an improved overview for inspections.

Simultaneous conformity with conditions (B1) and (B2) is advantageous because this ensures that when working with the zoom according to the present invention, the microscope magnification lies within the range of useful magnification, and a large field of view is available at low magnifications as well as sufficient resolution at the highest magnifications.

It has proven to be advantageous if the diameter of the zoom entrance pupil at maximum magnification satisfies the condition 21 mm<ENP≦27 mm. Such entrance pupil diameters are particularly well-suited in practice for meeting condition (B1). Larger entrance pupil diameters result in practice, especially in the case of stereomicroscopes, in large physical dimensions and also in increasingly severe aberrations. Smaller entrance pupil diameters, on the other hand, result in decreased resolution.

It is additionally advantageous in terms of zoom factor z if the condition 15<z≦20 is met. In combination with conditions (B1) and (B2), at these zoom factors operation in the range of useful magnification with sufficiently large field of view in the low-magnification region is easily achievable in practice.

The overall length of the zoom is of great importance for both ergonomic and production-engineering reasons. A long zoom means a large overall height for the microscope, and complicates fatigue-free viewing. Large entrance pupil diameters EP and large zoom factors z are difficult to achieve in physically short zooms. In the zoom according to the present invention, it has proven advantageous to impose an upper limit on zoom length L using the following condition (B3):

$$L/ENP \leq k \times \sqrt{z} \leq 1.37\sqrt{z}$$

where L is the length of the zoom measured between the outer lens element vertices of assemblies G1 and G4, and k is a length factor lying in the range from 1.34 and 1.37. For the embodiments according to the present invention described below, an upper limit using k=1.34 can be observed.

High-resolution microscopes according to the description above require a large zoom entrance pupil diameter ENP at maximum zoom magnification. To allow a short overall length nevertheless to be achieved for the zoom, the construction of assembly G1 should advantageously be such that focal length f1 of assembly G1 remains small despite a large ENP. The following inequality can be stated as a particularly favorable condition (B4):

$$f1/ENP \leq 3.5.$$

Exemplary embodiments of zooms according to the present invention are presented which meet condition (B4) at an upper limit of 3.3 rather than 3.5, and thus advantageously contribute to a short overall length and good imaging performance at large ENPs.

An upper limit on the number of lens elements is advantageous in terms of production engineering, and limits costs. Zooms according to the present invention having a maximum of eleven lens elements are especially favorable in this regard.

It is particularly advantageous in terms of the zoom's manufacturing costs if assembly G4 comprises a maximum of two lens elements cemented together. It is furthermore advisable if assembly G1 is constructed from a cemented group followed by an individual lens element, the cemented group comprising two lens elements cemented to one another, the individual lens element being biconvex, and the lens of positive refractive power in the cemented group pointing toward the object.

A particularly favorable embodiment of an afocal zoom according to the present invention is described by Table 1 referring to the first exemplary embodiment. This embodiment is described below in more detail.

BRIEF DESCRIPTION OF THE DRAWINGS

The invention and its advantages will be explained below in more detail by exemplary embodiments with reference to the appended drawings, in which:

FIGS. 4a and 4b show an afocal zoom of the existing art;

FIGS. 5a and 5b show the zoom of FIGS. 4a and 4b with a slight modification;

FIGS. 10a and 10b schematically depict a zoom according to the present invention in a third embodiment;

DETAILED DESCRIPTION OF THE INVENTION

FIGS. 1 through 5 have already been discussed in the introduction to the specification in conjunction with the existing art. Four embodiments of a zoom according to the present invention for use in a microscope, in particular a stereomicroscope, will be presented below. In combination with a tube of focal length fT=160 mm, the zooms presented here illuminate an intermediate image diameter of 22 mm. The invention is, however, by no means limited to that tube focal length.

First Embodiment

Figures 1A, 1B:
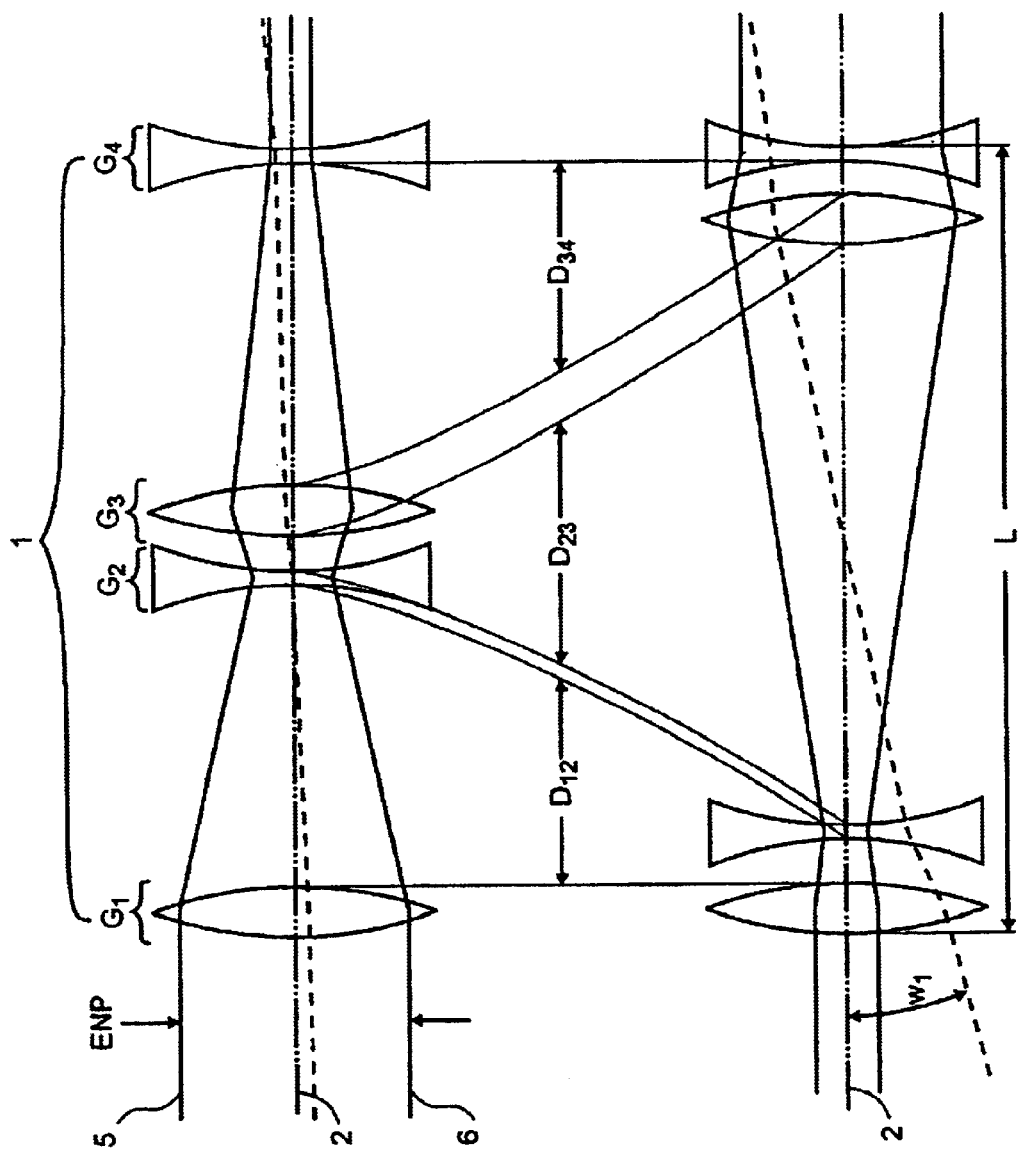
FIGS. 1a and 1b schematically depict a known zoom explained in the introduction to the specification.
Figure 2:
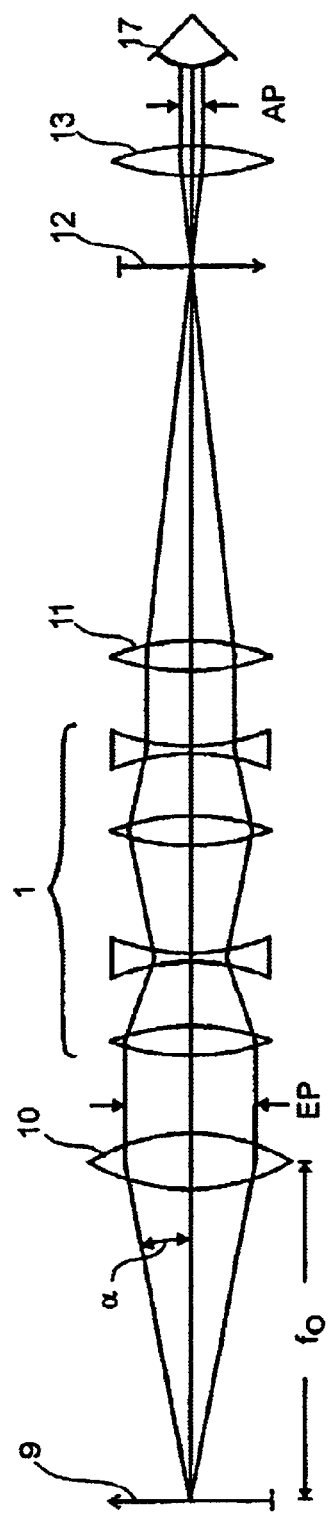
FIG. 2 schematically depicts a microscope, explained in the introduction to the specification, having an afocal zoom according to FIG. 1.
Figure 3:
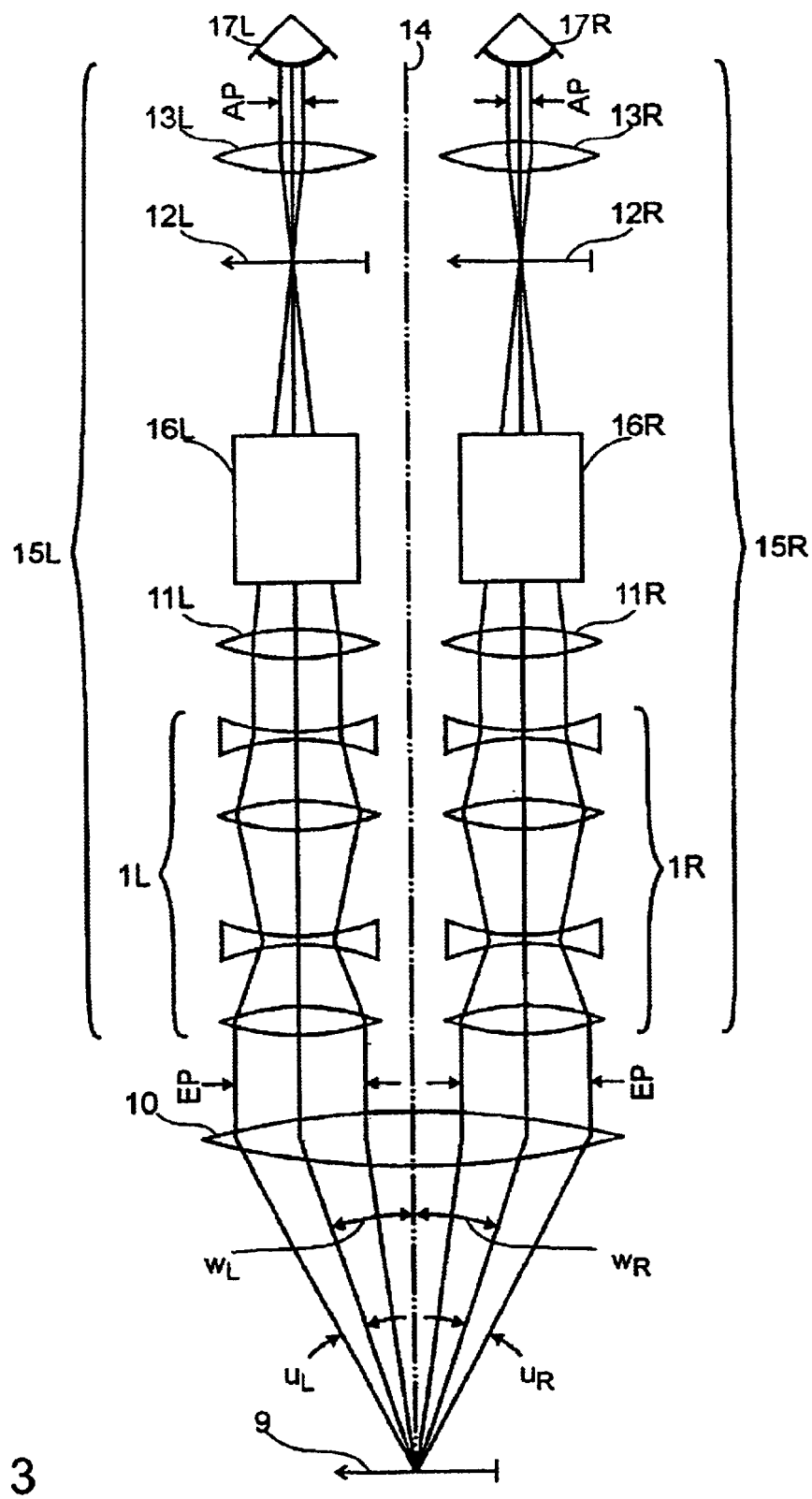
FIG. 3 schematically depicts a stereomicroscope of the telescopic type as explained in the introduction to the specification.
Figure 6A:
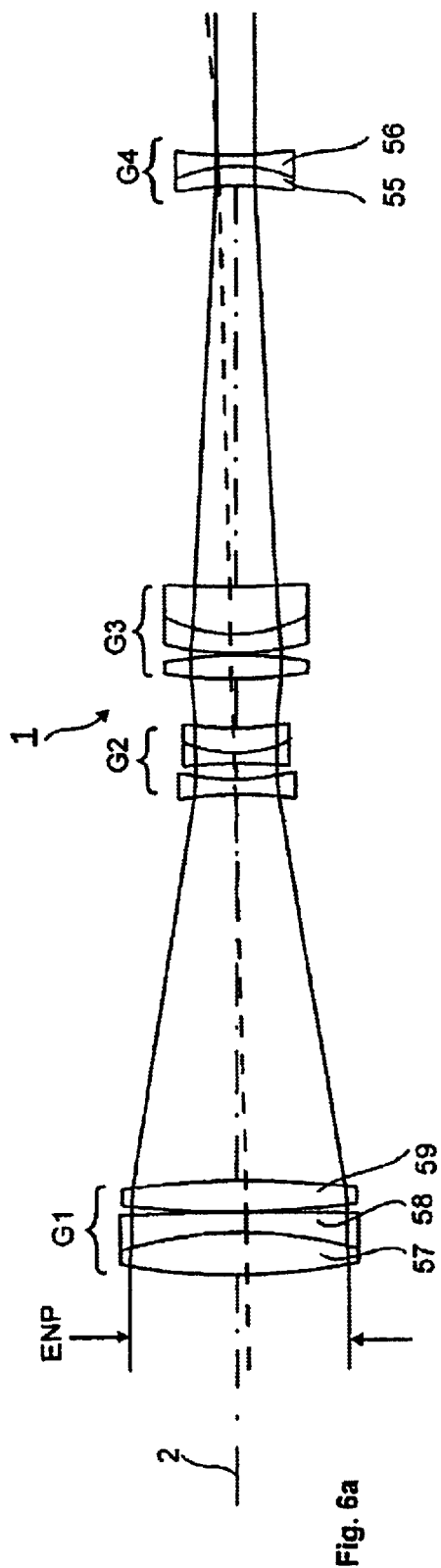
FIGS. 6a and 6b schematically depict an afocal zoom according to the present invention in a first embodiment.
Figure 6B:
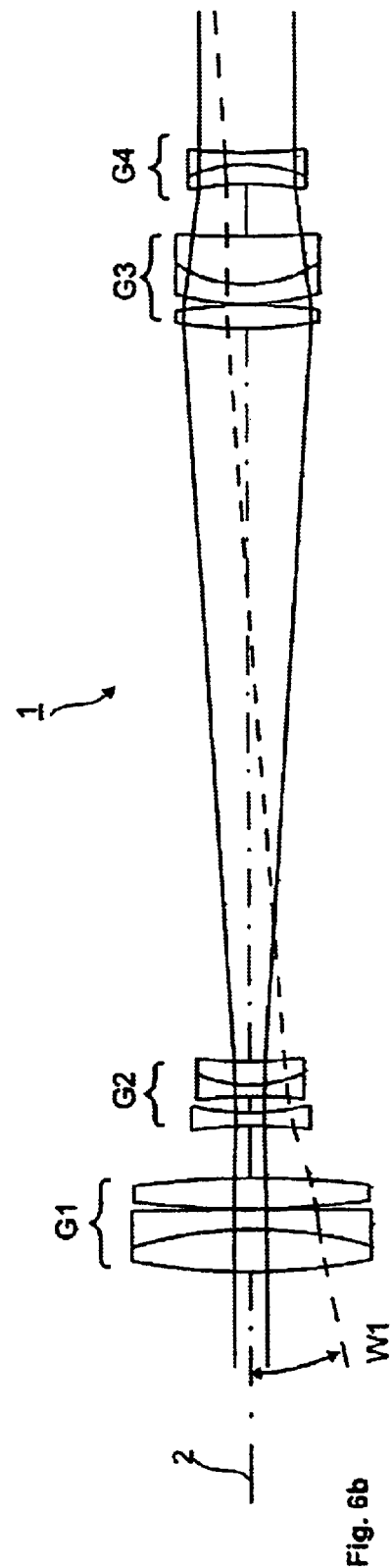

Zoom 1 depicted in FIG. 6 comprises four optical assemblies G1, G2, G3, and G4, of which G1 and G4 are arranged in stationary fashion while G2 and G3 can be displaced along optical axis 2 to adjust magnification VZO of zoom 1. FIG. 6a) shows the zoom setting at a maximum zoom magnification VZO=5.66, for which the diameter of the entrance pupil is maximal at ENP=22.5. FIG. 6b) shows the zoom setting at the lowest magnification VZO=0.35, resulting in a zoom factor z=16. At minimum magnification, the entrance field angle of the zoom is w1=11.23°.

This results in the following for condition (B1): VZO≦41×ENP/fT=41×22.5 mm/160 mm=5.77, so that the zoom with its maximum magnification of 5.66 meets condition (B1).

The result for second condition (B2) is: tan(w1)=0.20≧0.268×z/ENP=0.268×16/22.5=0.19, so that condition (B2) is also met.

In the example depicted here, the ratio of overall length L of zoom 1 to the maximum entrance pupil diameter ENP is L/ENP=5.33, so that condition (B3) is also met: 5.33≦1.37×√z=1.37×4=5.48.

With a focal length f1=73.06 for optical assembly G1 of zoom 1, the result for condition (B4) is: f1/ENP=3.25≦3.5.

In summary, it may be concluded that for the embodiment depicted, all four conditions (B1) through (B4) are met, so that the zoom according to the present invention guarantees a high microscope magnification that lies in the range of useful magnification, and makes possible observation of the object image with a usable field-of-view diameter of 22 mm with sufficient contrast. The overall length of the zoom (L=120 mm) is shorter than comparable zooms, and thus sufficiently short to ensure an overall microscope height which is favorable in terms of ergonomics and production engineering. This is also reinforced by the relatively short focal length of f1=73.06 mm at ENP=22.5 mm.

As is evident from FIG. 6a, optical assembly G1 comprises, viewed from the object end, firstly a cemented group in which one lens element 57 of positive refractive power and one lens element 58 of negative refractive power are cemented together, followed by one individual lens element 59. In the cemented group, lens element 57 with positive refractive power faces outward. Individual lens element 59 is biconvex. This configuration results in a total of five lens element surfaces. Optical assembly G2 comprises one individual lens element and a cemented group (surface nos. 6 through 10); assembly G3 also comprises one individual lens element and a cemented group (surface nos. 11 through 15), but unlike assembly G2 has positive refractive power. Lastly, assembly G4 is embodied as a single two-element cemented group with negative refractive power (surface nos. 16 through 18). Table 1 below provides the numerical data for this zoom:

TABLE 1

| Surface no. | Radius [mm] | Distance [mm] | $n_d$ | $v_d$ | $P_{g,F}$ | $P_{C,t}$ |
|---|---|---|---|---|---|---|
| 1 | 61.31 | 4.55 | 1.49700 | 81.6 | 0.5375 | 0.8236 |
| 2 | −42.17 | 2.0 | 1.74400 | 44.8 | 0.5655 | 0.7507 |
| 3 | −775.05 | 0.1 | | | | |
| 4 | 92.37 | 3.35 | 1.49700 | 81.6 | 0.5375 | 0.8236 |
| 5 | −92.37 | D1 41.59–5.51 | | | | |
| 6 | −42.45 | 1.5 | 1.48749 | 70.2 | 0.5300 | 0.8924 |
| 7 | 23.20 | 1.72 | | | | |
| 8 | −57.04 | 1.2 | 1.62041 | 60.3 | 0.5427 | 0.8291 |
| 9 | 12.31 | 2.6 | 1.78470 | 26.3 | 0.6135 | 0.6726 |
| 10 | 30.51 | D2 5.31–78.67 | | | | |
| 11 | 44.65 | 2.46 | 1.49700 | 81.6 | 0.5375 | 0.8236 |
| 12 | −44.65 | 0.2 | | | | |
| 13 | 26.40 | 2.1 | 1.74950 | 35.3 | 0.5869 | 0.7140 |
| 14 | 13.95 | 5.1 | 1.49700 | 81.6 | 0.5375 | 0.8236 |
| 15 | 94.46 | D3 42.84–5.56 | | | | |
| 16 | −26.60 | 2.2 | 1.67270 | 32.1 | 0.5988 | 0.7046 |
| 17 | −14.16 | 1.2 | 1.51633 | 64.1 | 0.5353 | 0.8687 |
| 18 | 45.96 | | | | | |

Each row of the table lists, from left to right, the surface number, radius of curvature, distance from the nearest surface, refractive index $n_d$, dispersion $v_d$, and partial dispersions $P_{g,F}$ and $P_{C,t}$. $n_d$ denotes the refractive index, $v_d=(n_d-1)/(n_F-n_C)$ the Abbé number, $P_{g,F}=(n_g-n_F)/(n_F-n_C)$ the relative partial dispersion for wavelengths g and F, and $P_{C,t}=(n_C-n_t)/(n_F-n_C)$ the relative partial dispersion for wavelengths C and t. An air gap is indicated by a blank line in the properties columns. D1, D2, and D3 are the variable distances.

The wavelengths are defined as follows: the yellow helium line d as λ=587.56 nm, the blue mercury line g as λ=435.83 nm, the blue hydrogen line F as λ=486.13 mm, the red hydrogen line C as λ=656.27 nm, and the infrared mercury line t as λ=1013.98 nm.

Figure 7A:
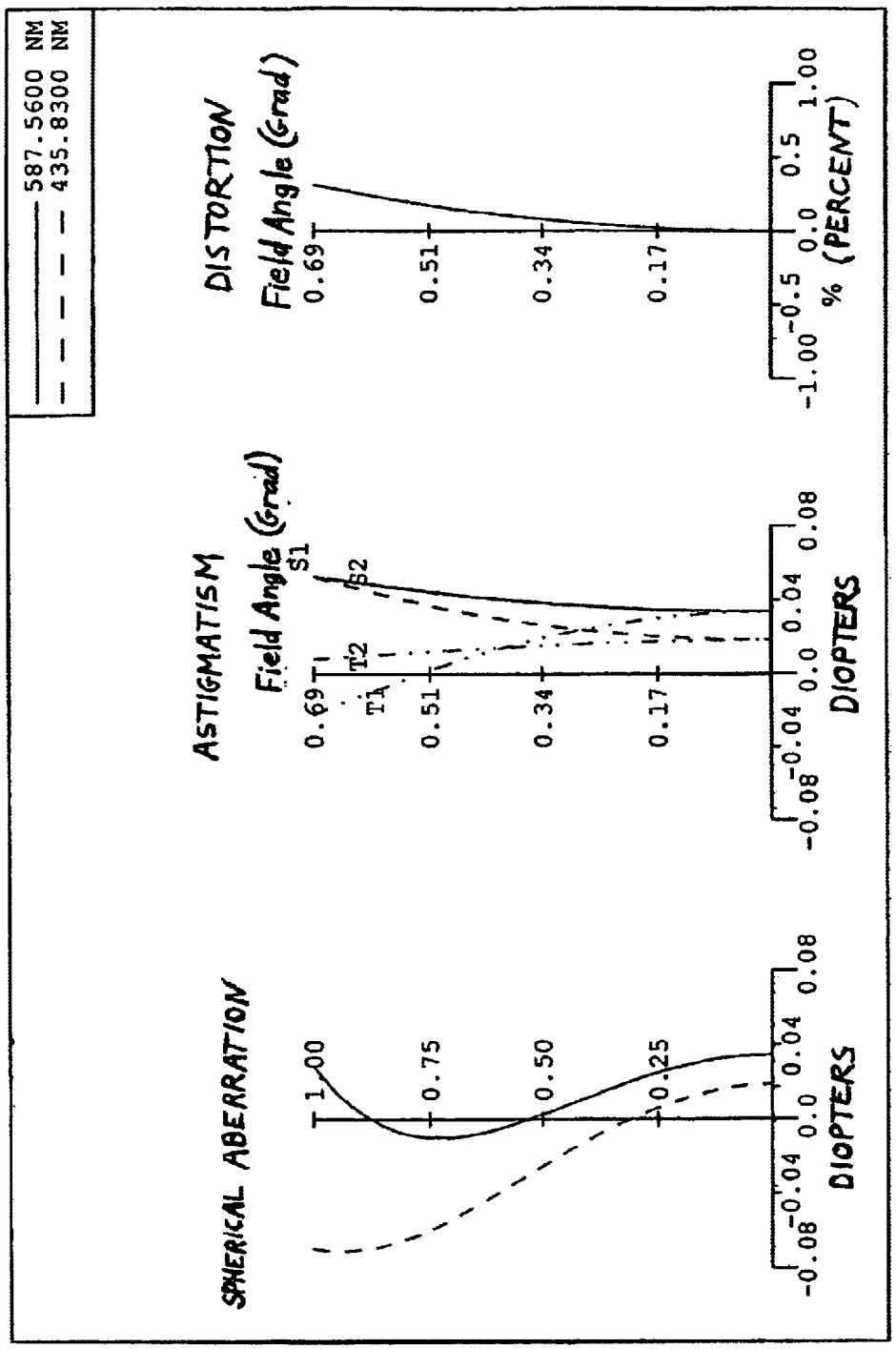
FIGS. 7a and 7b show the imaging performance of the zoom according to FIGS. 6a and 6b at maximum and minimum magnification.
Figure 7B:
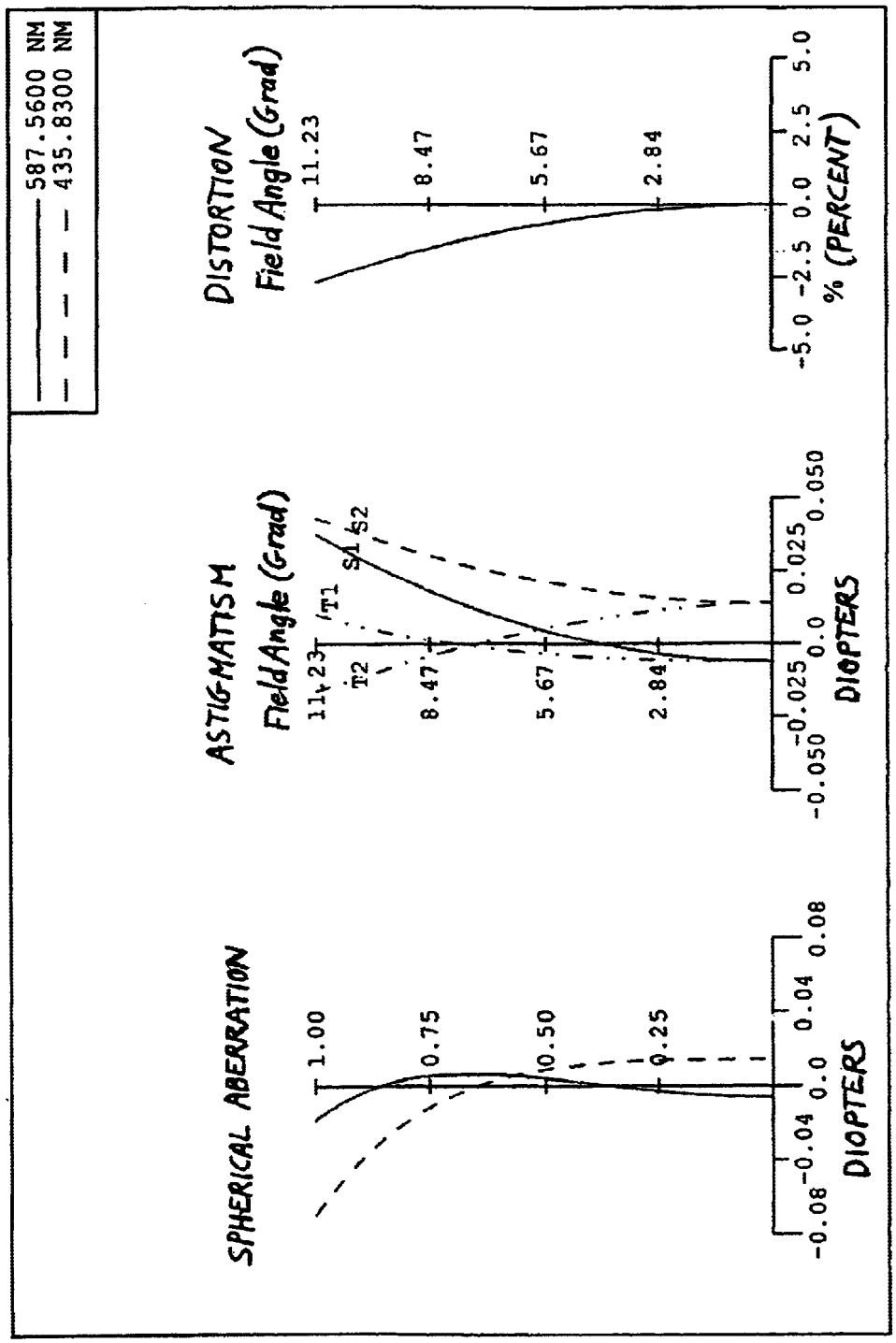

FIG. 7 illustrates the imaging performance of the zoom of FIG. 6. FIG. 7a) shows the imaging performance at maximum zoom magnification VZO=5.66, while FIG. 7b) depicts the imaging performance at minimum zoom magnification VZO=0.35. Spherical aberration, astigmatism, and distortion are plotted for two wavelengths, namely the d line at λ=587.56 nm and the g line at λ=435.83 nm. Spherical aberration is indicated in diopters as a function of pupil height. Astigmatism and distortion are plotted against field angle in diopters and as a percentage, respectively. For astigmatism, a distinction is made between tangential and sagittal.

The zoom exhibits good correction of spherical aberration and good correction of chromatic aberration, especially a definite reduction in the secondary spectrum, as is evident from the aberration curves for the 435.83 nm wavelength. Astigmatism, curvature of field, and distortion are such that compensation for the usual aberrations is effected by the tube lens and eyepiece. With the configuration of optical assembly G1 described above, it is possible on the one hand to correct spherical aberration at a large diameter ENP at maximum magnification, and on the other hand to correct astigmatism for a large field angle w1 at the weakest magnification. The advantageous result of suitably arranging an aperture in the zoom is that as magnification VZO is increased, the numerical aperture of the microscope and therefore, as discussed above, the microscope's resolution which is coupled thereto, continuously increase.

Second Embodiment

Figure 8A:
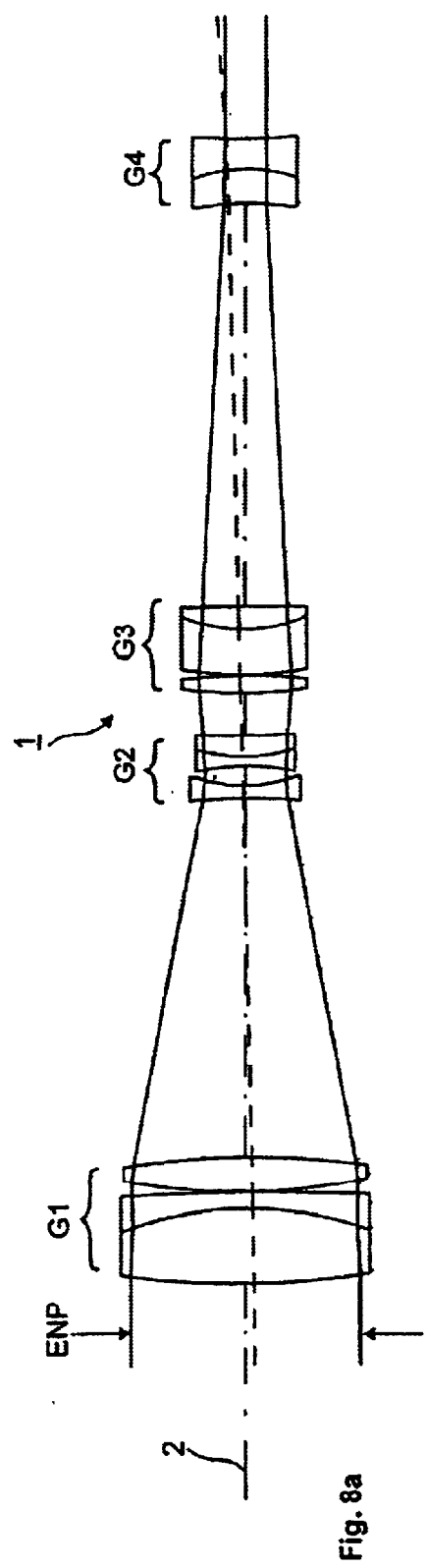
FIGS. 8a and 8b schematically depict a zoom according to the present invention in a second embodiment.
Figure 8B:
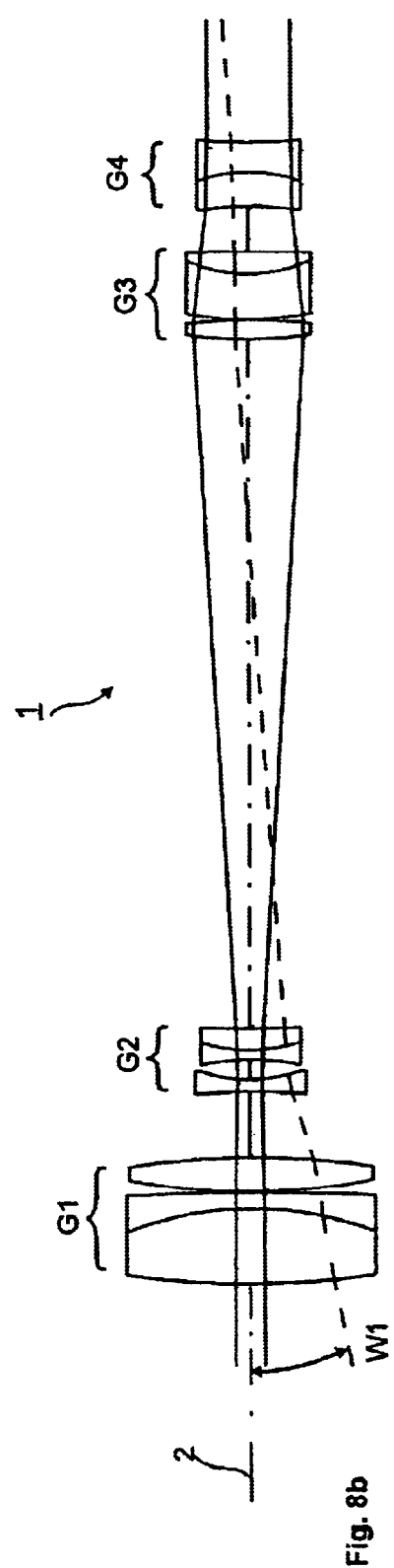

FIG. 8 schematically depicts a further zoom 1 according to the present invention having an entrance pupil diameter at maximum zoom magnification ENP=27 mm at a maximum zoom magnification VZO=5.66. Entrance field angle w1 of zoom 1 at minimum magnification is 11.14° at VZO=0.35, resulting in an overall zoom factor z=16.

From this condition (B1) can be calculated as follows: VZO≦41×ENP/fT=41×27/160=6.92, so that the maximum magnification VZO=5.66 meets this condition. In addition, tan(w1)=0.20≧0.268×16/27=0.16, which satisfies condition (B2).

The overall length of the zoom depicted in FIG. 8 is L=140 mm, so that L/ENP=5.19≦1.37×√z=5.48, thereby meeting condition (B3). Lastly, at a focal length f1=76.43 mm the ratio f1/ENP=2.83, thereby also meeting condition (B4). The zoom depicted in FIG. 8 consequently possesses all the advantages associated with conformity with the aforesaid conditions, as already stated for the first embodiment.

Table 2 below provides numerical data for the zoom shown in FIG. 8, the statements about surface numbers made in connection with FIG. 6 being applicable here as well.

TABLE 2

| Surface no. | Radius [mm] | Distance [mm] | $n_d$ | $v_d$ | $P_{g,F}$ | $P_{C,t}$ |
|---|---|---|---|---|---|---|
| 1 | 95.60 | 9.17 | 1.49700 | 81.6 | 0.5375 | 0.8236 |
| 2 | −40.60 | 2.0 | 1.74400 | 44.8 | 0.5655 | 0.7507 |
| 3 | −308.35 | 0.1 | | | | |
| 4 | 72.31 | 4.09 | 1.49700 | 81.6 | 0.5375 | 0.8236 |
| 5 | −98.39 | D1 43.98–7.94 | | | | |
| 6 | −82.59 | 1.5 | 1.48749 | 70.2 | 0.5300 | 0.8924 |
| 7 | 17.46 | 2.34 | | | | |
| 8 | −27.87 | 1.2 | 1.62041 | 60.3 | 0.5427 | 0.8291 |
| 9 | 17.84 | 2.67 | 1.78470 | 26.3 | 0.6135 | 0.6726 |
| 10 | 113.74 | D2 5.12–84.85 | | | | |
| 11 | 48.45 | 2.31 | 1.49700 | 81.6 | 0.5375 | 0.8236 |
| 12 | −64.60 | 0.1 | | | | |
| 13 | 38.96 | 5.56 | 1.74950 | 35.3 | 0.5869 | 0.7140 |
| 14 | 17.14 | 2.82 | 1.49700 | 81.6 | 0.5375 | 0.8236 |
| 15 | −269.15 | D3 49.25–5.56 | | | | |
| 16 | −33.02 | 4.26 | 1.67270 | 32.1 | 0.5988 | 0.7046 |
| 17 | −17.55 | 3.53 | 1.51633 | 64.1 | 0.5353 | 0.8687 |
| 18 | 52.77 | | | | | |

Each row of the table lists, from left to right, the surface number, radius of curvature, distance from the nearest surface, refractive index $n_d$, dispersion $v_d$, and partial dispersions $P_{g,F}$ and $P_{C,t}$. $n_d$ denotes the refractive index, $v_d=(n_d-1)/(n_F-n_C)$ the Abbé number, $P_{g,F}=(n_g-n_F)/(n_F-n_C)$ the relative partial dispersion for wavelengths g and F, and $P_{C,t}=(n_C-n_t)/(n_F-n_C)$ the relative partial dispersion for wavelengths C and t. An air gap is indicated by a blank line in the properties columns. D1, D2, and D3 are the variable distances.

Figure 9A:
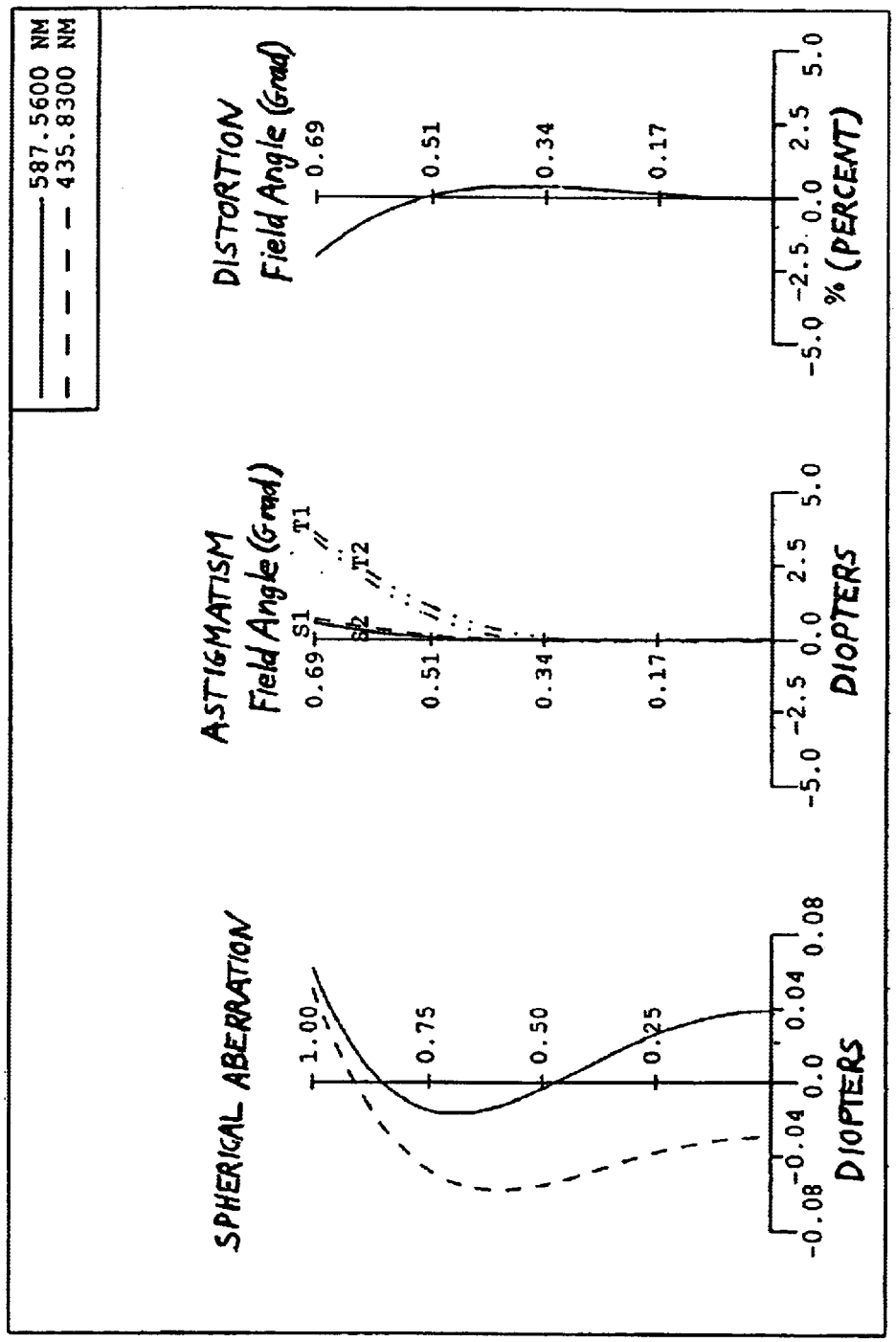
FIGS. 9a and 9b show the imaging performance of the zoom according to FIGS. 8a and 8b at maximum and minimum magnification.
Figure 9B:
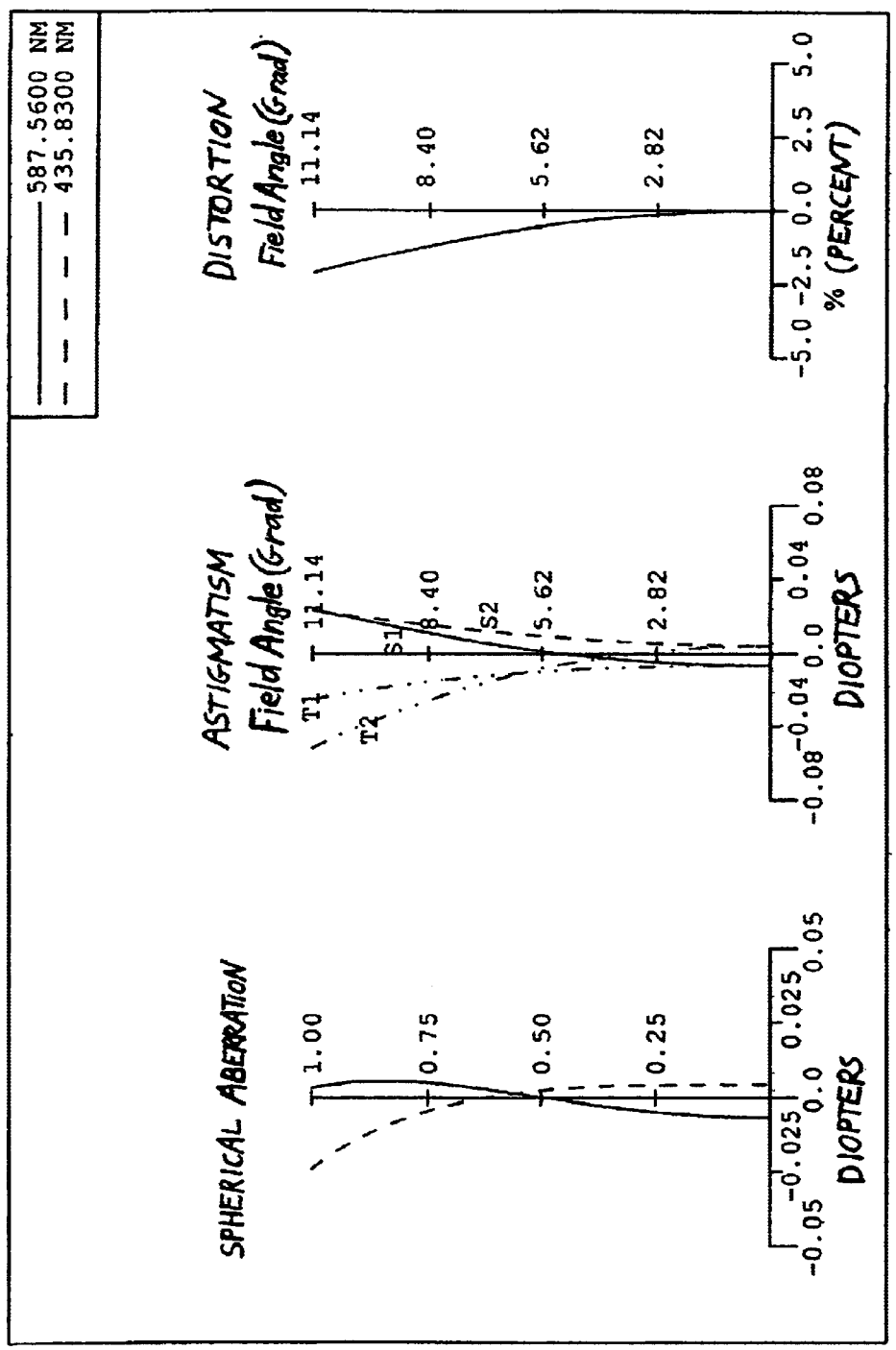

FIG. 9 shows the imaging performance of the zoom according to the present invention in the second embodiment at maximum magnification VZO=5.66 (FIG. 9a)) and at minimum magnification VZO=0.35 (FIG. 9b)). As regards details, the reader is referred to FIG. 7 that has already been explained in conjunction with the first exemplary embodiment.

Third Embodiment

FIG. 10 schematically depicts a zoom according to the present invention in a further embodiment. In this zoom, both the maximum zoom magnification and the maximum diameter of the entrance pupil have been considerably increased. The maximum diameter of the entrance pupil of zoom 1 at a maximum zoom magnification VZO=6.76 is ENP=27 mm. At a minimum zoom magnification VZO=0.34, the zoom entrance angle w1=11.59°, resulting in the following:

(B1) VZO≦41×ENP/fT=41×27/160=6.92. At a maximum magnification VZO=6.76, the upper limit of (B1) is not exceeded.

(B2) tan(w1)=0.2≧0.268×z/ENP=0.268×20/27=0.20, so that condition (B2) is also satisfied.

The overall length of the zoom in this instance is 140 mm, so that L/ENP=5.19≦1.37×√z=6.13, thereby meeting condition(B3). Optical assembly G1 of the zoom depicted in FIG. 10 possesses a focal length f1=79.86 mm, so that f1/ENP=2.96≦3.5, thereby also meeting condition (B4).

The advantages resulting from conformity with the aforesaid conditions correspond to those already discussed. The table below provides numerical data for the zoom depicted in FIG. 10 for each individual surface number.

TABLE 3

| Surface no. | Radius [mm] | Distance [mm] | $n_d$ | $v_d$ | $P_{g,F}$ | $P_{C,t}$ |
|---|---|---|---|---|---|---|
| 1 | 102.52 | 5.07 | 1.49700 | 81.6 | 0.5375 | 0.8236 |
| 2 | −42.42 | 2.0 | 1.74400 | 44.8 | 0.5655 | 0.7507 |
| 3 | −312.91 | 0.1 | | | | |
| 4 | 76.50 | 4.05 | 1.49700 | 81.6 | 0.5375 | 0.8236 |
| 5 | −102.65 | D1 49.35–9.02 | | | | |
| 6 | −46.18 | 1.5 | 1.48749 | 70.2 | 0.5300 | 0.8924 |
| 7 | 20.39 | 1.96 | | | | |
| 8 | −46.61 | 1.2 | 1.62041 | 60.3 | 0.5427 | 0.8291 |
| 9 | 13.60 | 2.67 | 1.78470 | 26.3 | 0.6135 | 0.6726 |
| 10 | 40.59 | D2 5.26–88.89 | | | | |
| 11 | 44.20 | 2.35 | 1.49700 | 81.6 | 0.5375 | 0.8236 |
| 12 | −58.28 | 0.1 | | | | |
| 13 | 32.66 | 5.13 | 1.74950 | 35.3 | 0.5869 | 0.7140 |
| 14 | 15.09 | 2.99 | 1.49700 | 81.6 | 0.5375 | 0.8236 |
| 15 | 437.12 | D3 50.13–6.83 | | | | |
| 16 | −29.87 | 4.95 | 1.67270 | 32.1 | 0.5988 | 0.7046 |
| 17 | −15.67 | 1.2 | 1.51633 | 64.1 | 0.5353 | 0.8687 |
| 18 | 43.26 | | | | | |

Each row of the table lists, from left to right, the surface number, radius of curvature, distance from the nearest surface, refractive index $n_d$, dispersion $v_d$, and partial dispersions $P_{g,F}$ and $P_{C,t}$. $n_d$ denotes the refractive index, $v_d=(n_d-1)/(n_F-n_C)$ the Abbé number, $P_{g,F}=(n_g-n_F)/(n_F-n_C)$ the relative partial dispersion for wavelengths g and F, and $P_{C,t}=(n_C-n_t)/(n_F-n_C)$ the relative partial dispersion for wavelengths C and t. An air gap is indicated by a blank line in the properties columns. D1, D2, and D3 are the variable distances.

Figure 11A:
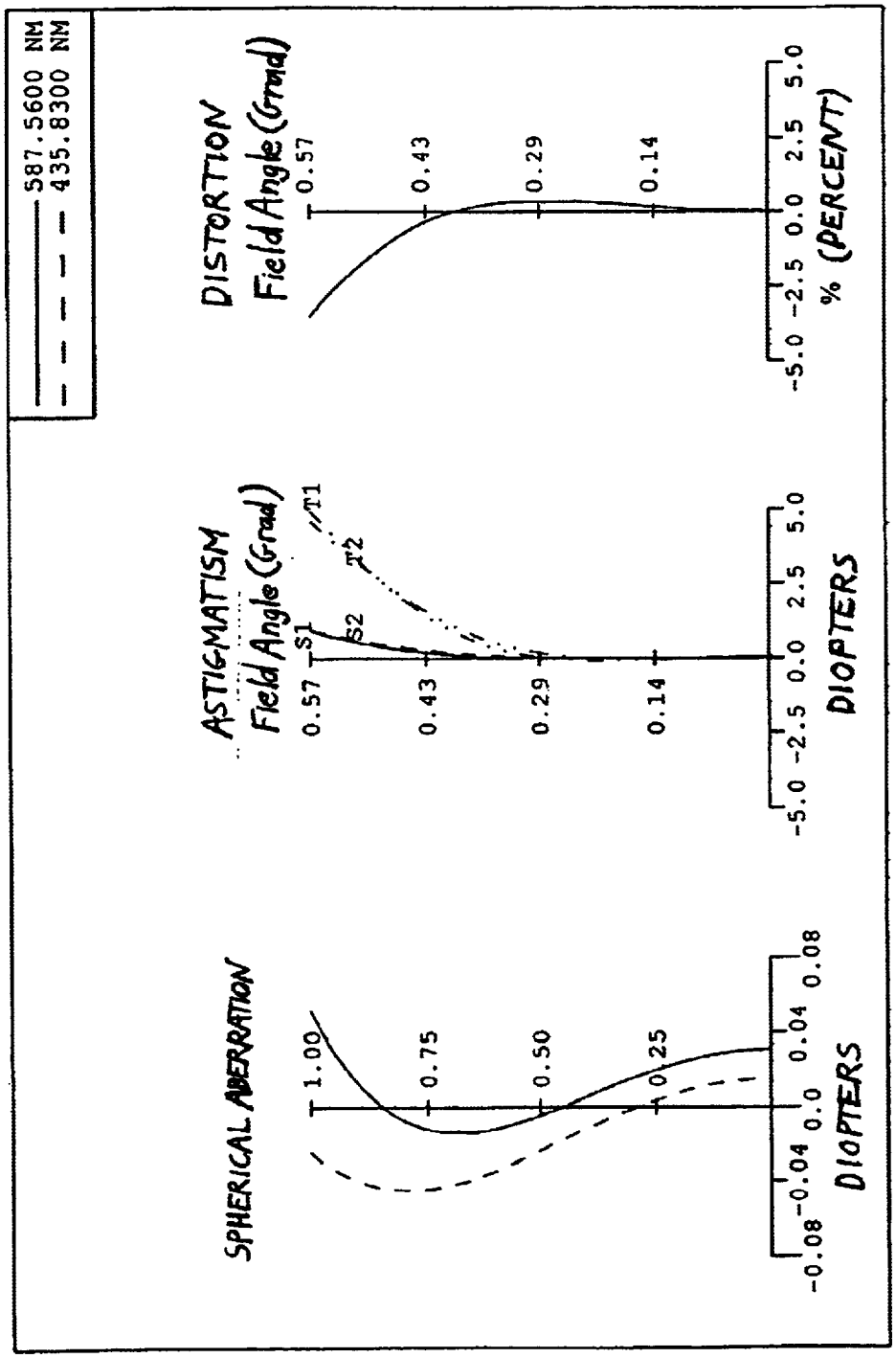
FIGS. 11a and 11b show the imaging performance of the zoom according to FIGS. 10a and 10b at maximum and minimum magnification.
Figure 11B:
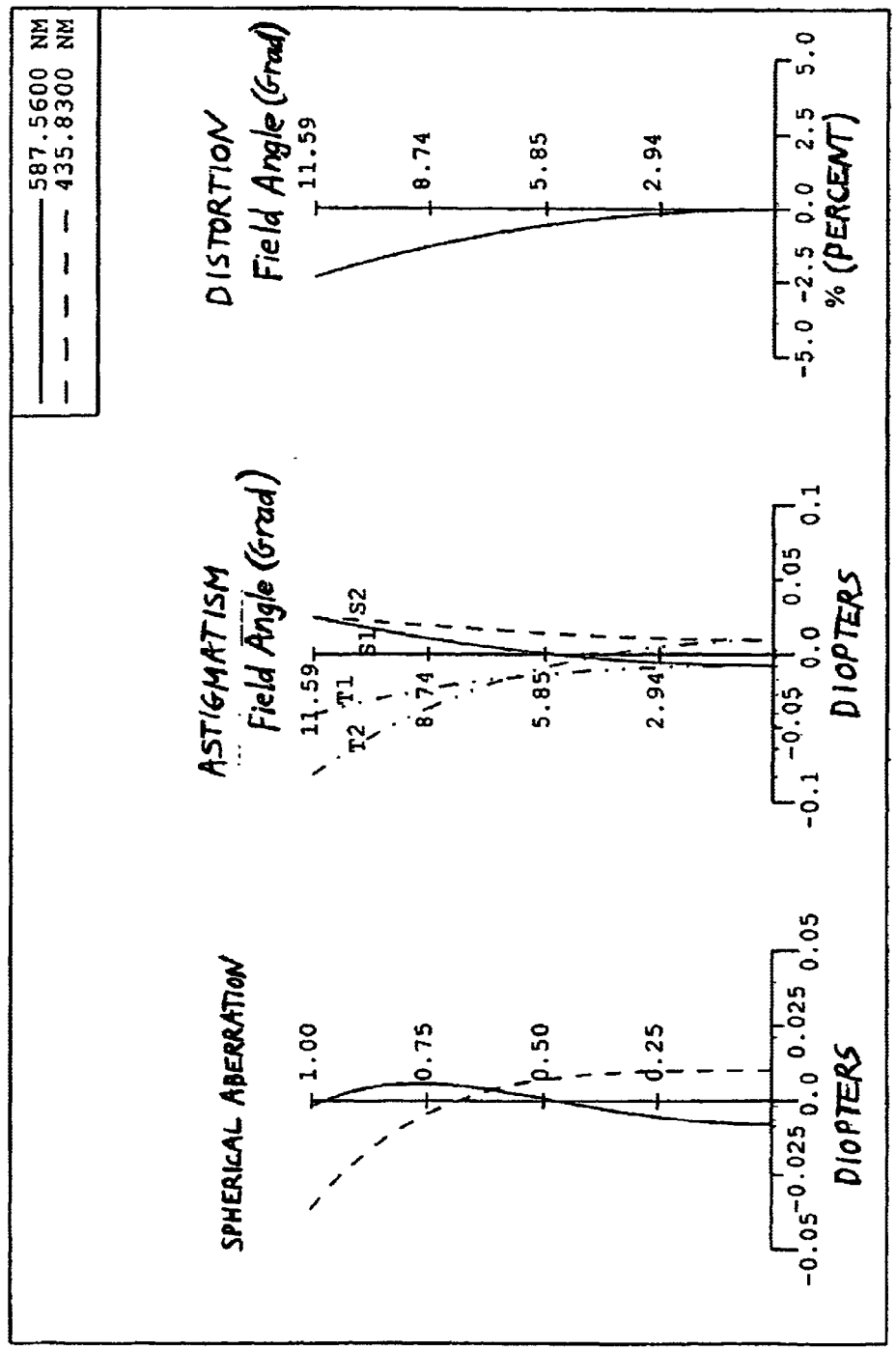

FIG. 11 shows the imaging performance of the third embodiment of the zoom according to the present invention, spherical aberration, astigmatism, and distortion being depicted in FIG. 11a) for a maximum magnification VZO=6.76, and in FIG. 11b) for a minimum magnification VZO=0.34. Regarding the details of this presentation and the properties resulting therefrom, the reader is referred to the similarly constructed zoom of the first embodiment (cf. FIG. 7).

Fourth Embodiment

Figure 12A:
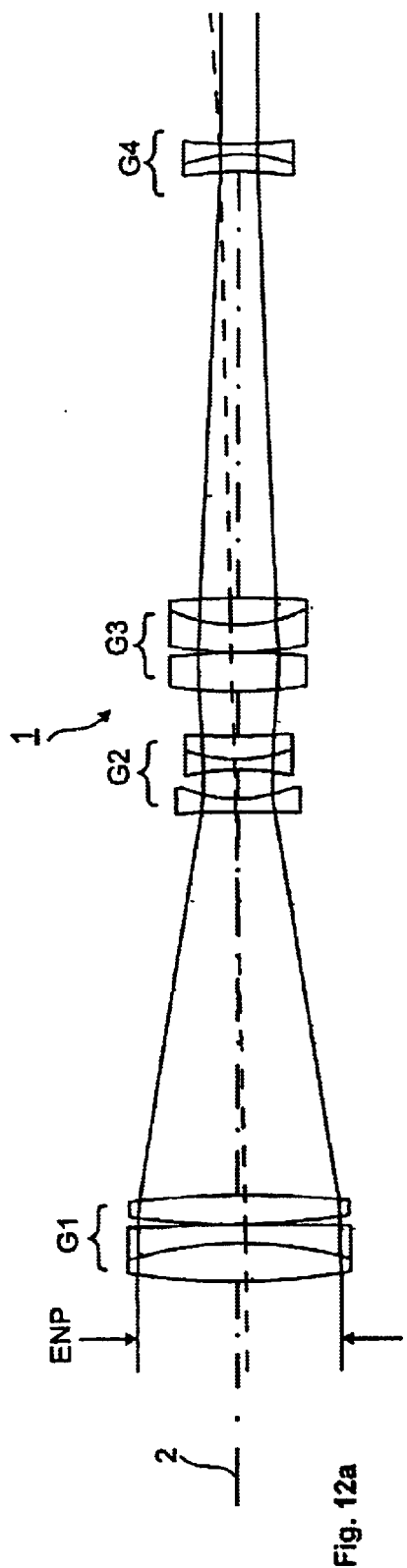
FIGS. 12a and 12b schematically depict a zoom according to the present invention in a fourth embodiment.
Figure 12B:
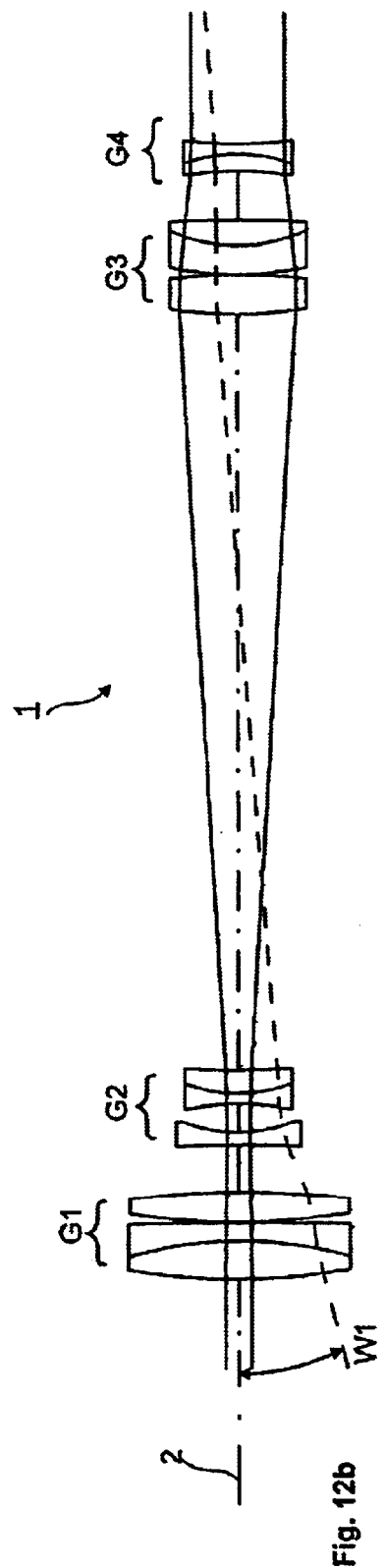

Lastly, FIG. 12 shows a fourth embodiment of zoom 1 according to the present invention, once again in a configuration similar to that of the previous embodiments; in this example, a higher zoom factor z=20 is associated with a smaller maximum entrance pupil diameter ENP=22.5. Maximum zoom magnification VZO=5.66, as depicted in FIG. 12a); the maximum entrance field angle of the zoom at minimum magnification is w1=13.88°. Focal length f1 of first optical group G1 is f1=73.48 mm. This yields:

(B1) VZO ≦41×ENP/fT=41×22.5/160=5.77, so that the maximum zoom magnification of 5.66 remains below this lower limit.

(B2) tan(w1)=0.25≧0.268×z/ENP=0.268×20/22.5=0.24.

(B3) L/ENP=5.78≦1.37×√z=6.13

(B4) f1/ENP=3.27≦3.5.

The zoom depicted in FIG. 12 thus also combines all the advantages resulting from conformity with conditions (B1) through (B4). Table 4 below reproduces numerical data for each of the 18 surfaces of the zoom configuration in FIG. 12.

TABLE 4

| Surface no. | Radius [mm] | Distance [mm] | $n_d$ | $v_d$ | $P_{g,F}$ | $P_{C,t}$ |
|---|---|---|---|---|---|---|
| 1 | 70.76 | 4.39 | 1.49700 | 81.6 | 0.5375 | 0.8236 |
| 2 | −42.39 | 2.0 | 1.74400 | 44.8 | 0.5655 | 0.7507 |
| 3 | −478.21 | 0.1 | | | | |
| 4 | 78.22 | 3.37 | 1.49700 | 81.6 | 0.5375 | 0.8236 |
| 5 | −104.35 | D1 44.01–5.4 | | | | |
| 6 | −133.05 | 1.5 | 1.48749 | 70.2 | 0.5300 | 0.8924 |
| 7 | 15.41 | 3.22 | | | | |
| 8 | −26.68 | 1.2 | 1.62041 | 60.3 | 0.5427 | 0.8291 |
| 9 | 15.90 | 2.70 | 1.78470 | 26.3 | 0.6135 | 0.6726 |
| 10 | 79.38 | D2 5.11–86.89 | | | | |
| 11 | 46.72 | 4.40 | 1.49700 | 81.6 | 0.5375 | 0.8236 |
| 12 | −75.42 | 0.1 | | | | |
| 13 | 37.82 | 3.20 | 1.74950 | 35.3 | 0.5869 | 0.7140 |
| 14 | 17.47 | 2.90 | 1.49700 | 81.6 | 0.5375 | 0.8236 |
| 15 | −126.80 | D3 48.67–5.5 | | | | |
| 16 | −32.81 | 1.94 | 1.67270 | 32.1 | 0.5988 | 0.7046 |
| 17 | −16.80 | 1.2 | 1.51633 | 64.1 | 0.5353 | 0.8687 |
| 18 | 47.26 | | | | | |

Each row of the table lists, from left to right, the surface number, radius of curvature, distance from the nearest surface, refractive index $n_d$, dispersion $v_d$, and partial dispersions $P_{g,F}$ and $P_{C,t}$. $n_d$ denotes the refractive index, $v_d = (n_d-1)/(n_F-n_C)$ the Abbé number, $P_{g,F}=(n_g-n_F)/(n_F-n_C)$ the relative partial dispersion for wavelengths g and F, and $P_{C,t}=(n_C-n_t)/(n_F-n_C)$ the relative partial dispersion for wavelengths C and t. An air gap is indicated by a blank line in the properties columns. D1, D2, and D3 are the variable distances.

Figure 13A:
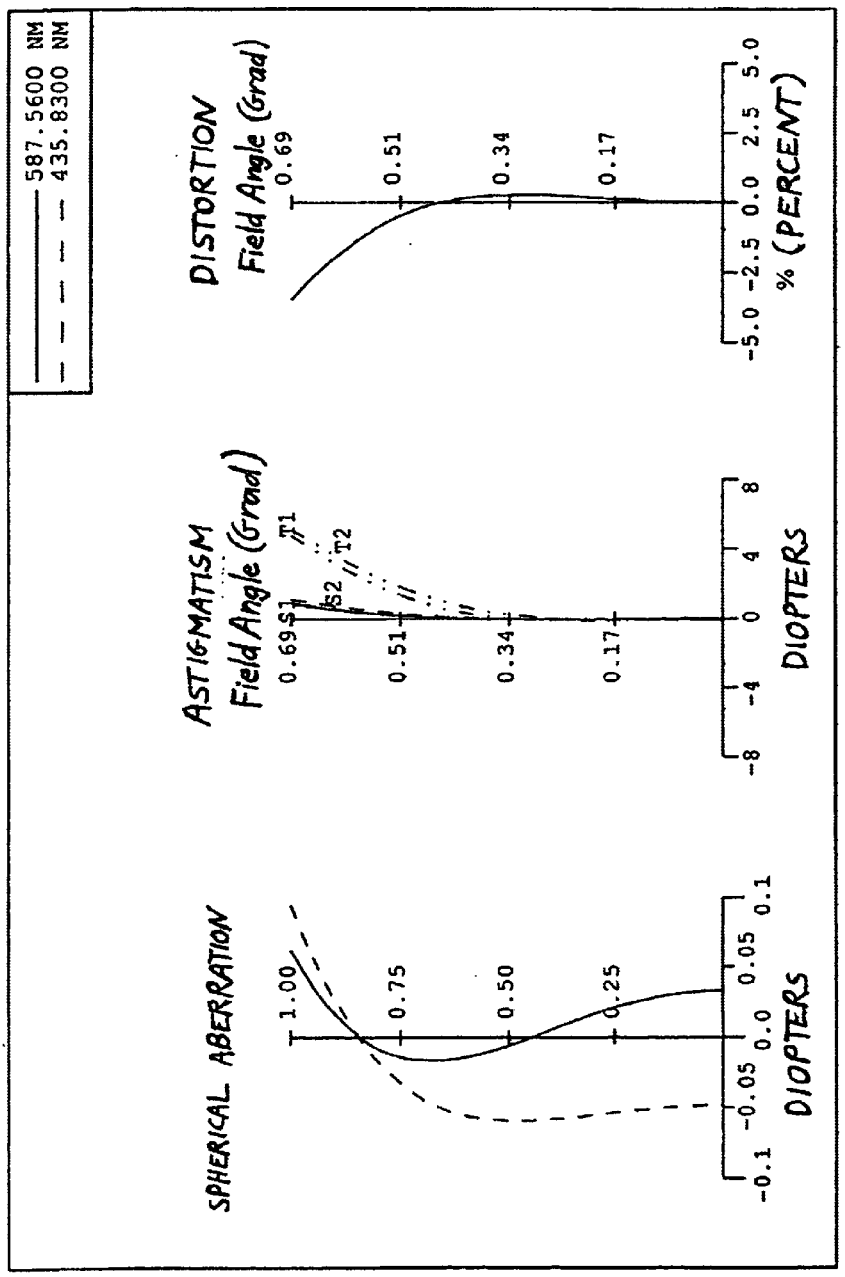
FIGS. 13a and 13b show the imaging performance of the zoom according to FIGS. 12a and 12b at maximum and minimum magnification.
Figure 13B:
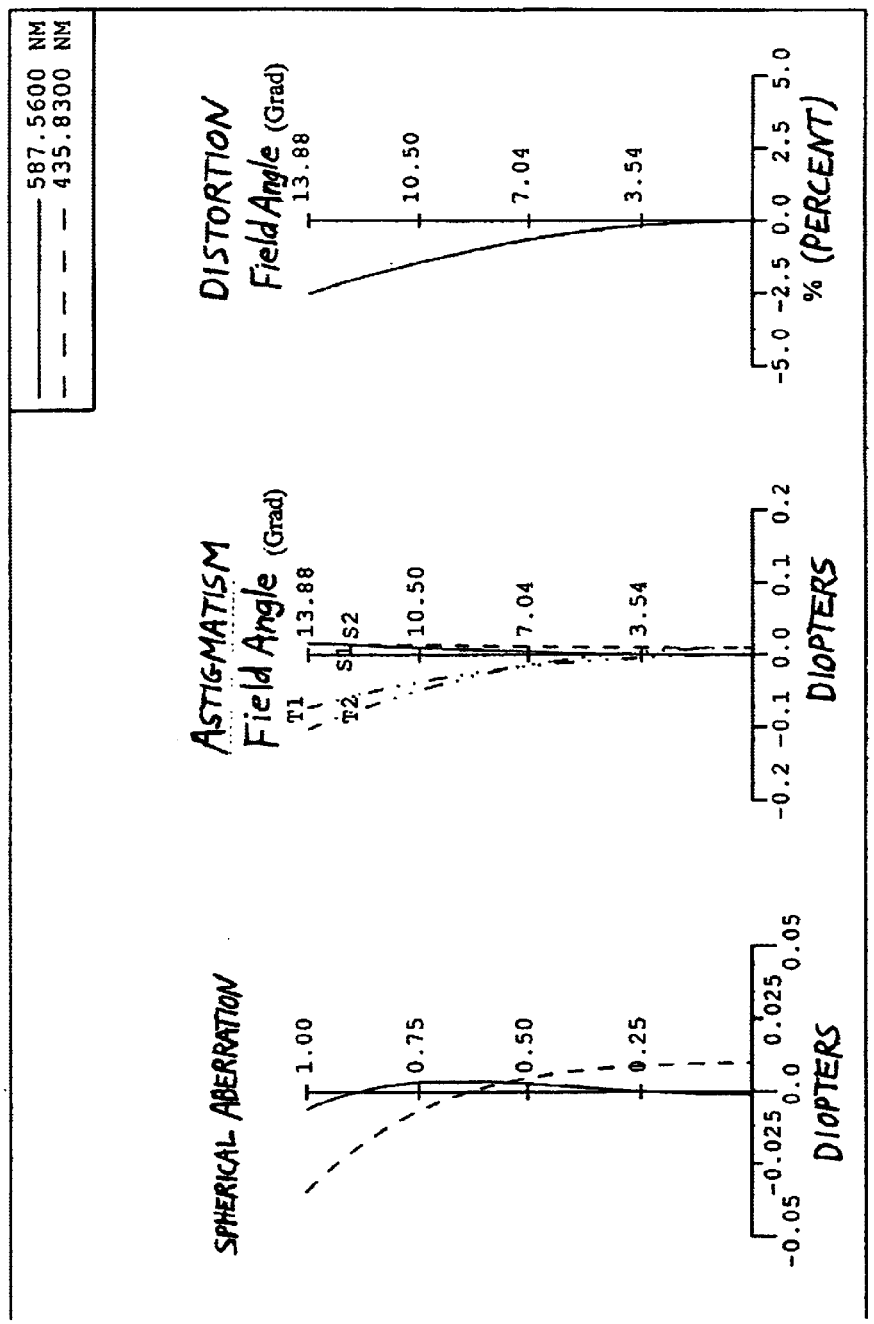

FIG. 13 shows the imaging performance of the according to the fourth embodiment in the usual depiction, for a zoom magnification VZO=5.66 in FIG. 13a) and for a zoom magnification VZO=0.28 in FIG. 13b). Since the zoom is constructed similarly to the one described in the first exemplary embodiment, the corresponding explanations apply here as well.

Parts list

| | |
|---|---|
| 1 | A focal zoom |
| 2 | Optical axis of zoom |
| 5 | Upper marginal ray |
| 6 | Lower marginal ray |
| 9 | Object at anterior focal point of objective |
| 10 | Objective |
| 11, 11L, and 11R | Tube lens (in left or right channel in stereomicroscopes) |
| 12, 12L, and 12R | Intermediate image (in left or right channel in stereomicroscopes) |
| 13, 13L, and 13R | Eyepiece (in left or right channel in stereomicroscopes) |
| 14 | Axis of objective 10 |
| 15L and 15R | Left and right viewing channel in stereomicroscopes |
| 16L and 16R | Image erection system in left and right viewing channel |
| 17, 17L and 17R | Eye; left and right eye |
| 55, 56 | Cemented lens elements of assembly G4 |
| 57, 58 | Cemented lens elements of assembly G1 |
| 59 | Individual lens element of assembly G1 |
| AP | Diameter of exit pupil of a microscope |
| D12 | Distance between zoom groups G1 and G2 |
| D23 | Distance between zoom groups G2 and G3 |
| D34 | Distance between zoom groups G3 and G4 |
| EP | Diameter of entrance pupil of zoom |

-continued

Parts list

| | |
|---|---|
| ENP | Diameter of entrance pupil of zoom at maximum magnification |
| f1 | Focal length of first lens group G1 |
| f2 | Focal length of second lens group G2 |
| f3 | Focal length of third lens group G3 |
| f4 | Focal length of fourth lens group G4 |
| fO | Focal length of objective |
| fT | Focal length of tube lens |
| G1 | Optical assembly of first zoom group |
| G2 | Optical assembly of second zoom group |
| G3 | Optical assembly of third zoom group |
| G4 | Optical assembly of fourth zoom group |
| k | Length factor |
| L | Mechanical overall length of zoom, defined by distance between outer vertices of groups G1 and G4 |
| nA | Numerical aperture of objective |
| u, uR, uL | Half the angular aperture of the beam cone, with vertex at the center of the object, that is limited by ENP |
| VZO | Magnification of zoom |
| wA | Exit field angle from a telescope/zoom |
| wE | Entrance field angle into a telescope/zoom |
| wl | Entrance field angle of zoom at minimum zoom magnification |
| wL, wR | Angle with respect to optical axis 14 of the beam that, after refraction in objective 10, constitutes the optical axis of left or right observation channel 15L or 15R |
| z | Zoom factor = maximum zoom magnification/minimum zoom magnification |

Conditions Used (B1) $VZO \leq 41 \times ENP/fT$ (B2) $\tan(w1) \geq 0.268 \times z/ENP$ (B3) $L/ENP \leq 1.37 \times \sqrt{z}$ (B4) $f1/ENP \leq 3.5$

What is claimed is:

1. An afocal zoom (1) for use in microscopes having a tube lens (11), the zoom comprising four successive optical assemblies (G1, G2, G3, G4) when viewed from the object end, the first assembly (G1) having a positive focal length (f1), the second assembly (G2) a negative focal length (f2), the third assembly (G3) a positive focal length (f3), and the fourth assembly (G4) a negative focal length (f4), and the first and the fourth assembly (G1, G4) being arranged in stationary fashion and the second and the third assembly (G2, G3) being arranged movably for modifying the magnification of the zoom (1), the zoom magnification decreasing with increasing distance (D23) between the two assemblies (G2, G3), wherein the magnification (VZO) of the zoom meets the following condition:

$$VZO \leq 41 \times ENP/fT,$$

where ENP denotes the diameter of the zoom entrance pupil at maximum zoom magnification, and fT the focal length of the tube lens (11) of the microscope, and where ENP>21 mm.

2. An afocal zoom (1) for use in microscopes having a tube lens (11), the zoom comprising four successive optical assemblies (G1, G2, G3, G4) when viewed from the object end, the first assembly (G1) having a positive focal length (f1), the second assembly (G2) a negative focal length (f2), the third assembly (G3) a positive focal length (f3), and the fourth assembly (G4) a negative focal length (f4), and the first and the forth assembly (G1, G4) being arranged in stationary fashion and the second and the third assembly (G2, G3) being arranged movably for modifying the magnification of the zoom (1), the zoom magnification decreasing with increasing distance (D23) between the two assemblies (G2, G3), wherein the entrance field angle (w1) of the zoom (1) at minimum zoom magnification meets the following condition:

$$\tan(w1) \geq 0.268 \times z/ENP,$$

where z denotes the zoom factor and ENP the diameter of the zoom entrance pupil, in units of mm, at maximum zoom magnification, and where ENP>21 mm and z>15.

3. The afocal zoom (1) as defined in claim 1, wherein the entrance field angle (w1) of the zoom (1) at minimum magnification meets the condition $$\tan(w1) \geq 0.268 \times z/ENP,$$

where z denotes the zoom factor and ENP is defined in units of mm, and where z>15.

4. The afocal zoom (1) as defined in claim 1, wherein the diameter of the zoom entrance pupil (ENP) at maximum zoom magnification meets the condition 21 mm<ENP≦27 mm.

5. The afocal zoom (1) as defined in claim 2, wherein the zoom factor (z) meets the condition 15<z≦20.

6. The afocal zoom (1) as defined in claim 1, wherein for the length (L) of the zoom, the following condition is met:

$$L/ENP \leq 1.37 \times \sqrt{z},$$

wherein z denotes the zoom factor and L the length of the zoom measured between the outer lens element vertices of the stationary assemblies (G1, G4).

7. The afocal zoom (1) as defined in claim 1, wherein it meets the condition f1/ENP≦3.5.

8. The afocal zoom (1) as defined in claim 1, wherein the zoom is assembled from no more than eleven lens elements.

9. The afocal zoom (1) as defined in claim 1, wherein the fourth assembly (G4) comprises no more than two lens elements (55, 56) cemented to one another.

10. The afocal zoom (1) as defined in claim 1, wherein the first assembly (G1) comprises no more than one cemented group made up of two lens elements (57, 58) cemented to one another and one individual lens element (59), the cemented group being arranged first and the individual lens element (59) next when viewed from the object end, the individual lens element (59) being biconvex, and the lens element (57) with positive refractive power in the cemented group being arranged toward the object side.

11. The afocal zoom (1) as defined in claim 1, characterized by a lens arrangement specified by the table below, surface nos. 1 through 5 being associated with the first assembly (G1), surface nos. 6 through 10 with the second assembly (G2), surface nos. 11 through 15 with the third assembly (G3), and surface nos. 16 through 18 with the fourth assembly (G4), and in which ENP=22.5 mm and z=16:

| Surface no. | Radius [mm] | Distance [mm] | $n_d$ | $v_d$ | $P_{g,F}$ | $P_{C,t}$ |
|---|---|---|---|---|---|---|
| 1 | 61.31 | 4.55 | 1.49700 | 81.6 | 0.5375 | 0.8236 |
| 2 | −42.17 | 2.0 | 1.74400 | 44.8 | 0.5655 | 0.7507 |
| 3 | −775.05 | 0.1 | | | | |
| 4 | 92.37 | 3.35 | 1.49700 | 81.6 | 0.5375 | 0.8236 |
| 5 | −92.37 | D1 41.59–5.51 | | | | |
| 6 | −42.45 | 1.5 | 1.48749 | 70.2 | 0.5300 | 0.8924 |
| 7 | 23.20 | 1.72 | | | | |
| 8 | −57.04 | 1.2 | 1.62041 | 60.3 | 0.5427 | 0.8291 |
| 9 | 12.31 | 2.6 | 1.78470 | 26.3 | 0.6135 | 0.6726 |
| 10 | 30.51 | D2 5.31–78.67 | | | | |
| 11 | 44.65 | 2.46 | 1.49700 | 81.6 | 0.5375 | 0.8236 |
| 12 | −44.65 | 0.2 | | | | |
| 13 | 26.40 | 2.1 | 1.74950 | 35.3 | 0.5869 | 0.7140 |
| 14 | 13.95 | 5.1 | 1.49700 | 81.6 | 0.5375 | 0.8236 |
| 15 | 94.46 | D3 42.84–5.56 | | | | |
| 16 | −26.60 | 2.2 | 1.67270 | 32.1 | 0.5988 | 0.7046 |
| 17 | −14.16 | 1.2 | 1.51633 | 64.1 | 0.5353 | 0.8687 |
| 18 | 45.96 | | | | | | the surface number of a lens element or a cemented group, the radius of curvature of the respective surface, the distance from the nearest surface, the refractive index ($n_d$), the dispersion ($v_d$), and the partial dispersions ($P_{g,F}$) and ($P_{C,t}$) being listed in the columns of the table, and $n_d$ denoting the refractive index, $v_d=(n_d-1)/(n_F-n_C)$ the Abbé number, $P_{g,F}=(n_g-n_F)/(n_F-n_C)$ the relative partial dispersion for wavelengths g and F, and $P_{C,t}=(n_C-n_t)/(n_F-n_C)$ the relative partial dispersion for wavelengths C and t, an air gap furthermore being indicated by a blank line in the properties columns, and D1, D2, and D3 denoting variable distances.

12. A microscope having an afocal zoom (1) as defined in claim 1.

13. A stereomicroscope of the telescopic type having an afocal zoom (1) as defined in claim 1.

* * * * *